US010158491B2

(12) United States Patent
Bonsignore

(10) Patent No.: US 10,158,491 B2
(45) Date of Patent: Dec. 18, 2018

(54) QUALIFIED ELECTRONIC SIGNATURE SYSTEM, METHOD AND MOBILE PROCESSING TERMINAL FOR QUALIFIED ELECTRONIC SIGNATURE

(71) Applicant: Antonio Salvatore Piero Vittorio Bonsignore, Corbetta (IT)

(72) Inventor: Antonio Salvatore Piero Vittorio Bonsignore, Corbetta (IT)

( * ) Notice: Subject to any disclaimer, the term of this patent is extended or adjusted under 35 U.S.C. 154(b) by 149 days.

(21) Appl. No.: 14/782,939

(22) PCT Filed: Apr. 8, 2013

(86) PCT No.: PCT/EP2013/057312
§ 371 (c)(1),
(2) Date: Oct. 7, 2015

(87) PCT Pub. No.: WO2014/166519
PCT Pub. Date: Oct. 16, 2014

(65) Prior Publication Data
US 2016/0043867 A1 Feb. 11, 2016

(51) Int. Cl.
*G06F 21/00* (2013.01)
*H04L 29/06* (2006.01)
(Continued)

(52) U.S. Cl.
CPC ............ *H04L 9/3242* (2013.01); *G06F 21/34* (2013.01); *G06Q 20/085* (2013.01);
(Continued)

(58) Field of Classification Search
CPC . H04L 9/3242; H04L 63/0442; H04L 9/3234; H04L 63/0853; H04L 9/3247;
(Continued)

(56) References Cited

U.S. PATENT DOCUMENTS

2013/0046991 A1* 2/2013 Lu .................. H04L 9/3234
713/176

FOREIGN PATENT DOCUMENTS

EP     2375630 A2 * 10/2011  ........... H04L 9/3236

OTHER PUBLICATIONS

Rossnagel, Heiko; "Mobile Qualified Electronic Signatures and Certification on Demand"; Lecture Notes in Computer Science, vol. 3093; Jun. 2004; pp. 1-14.*

(Continued)

*Primary Examiner* — Shewaye Gelagay
*Assistant Examiner* — Courtney D Fields
(74) *Attorney, Agent, or Firm* — Polsinelli PC

(57) ABSTRACT

A Qualified Electronic Signature (QES) system configured to exchange data with first processing means of the requester configured to allow a requester to generate requests requesting a qualified electronic signature through said system to a recipient. The system comprises second processing means of the recipient configured to allow the recipient of the request to sign with his qualified electronic signature. Said second processing means comprise a mobile processing terminal for qualified electronic signature of mobile type, adapted to receive request messages at least on a wireless network able to address said messages, through proximity or remote communications, on the basis of at least one terminal identifier of said mobile processing terminal to said user recipient; said second processing means are adapted to send qualified electronic signature at least on a wireless network suitable for proximity or remote communications in order to verify the signature of the recipient through said system and perform the request.

9 Claims, 11 Drawing Sheets

Figure 1:
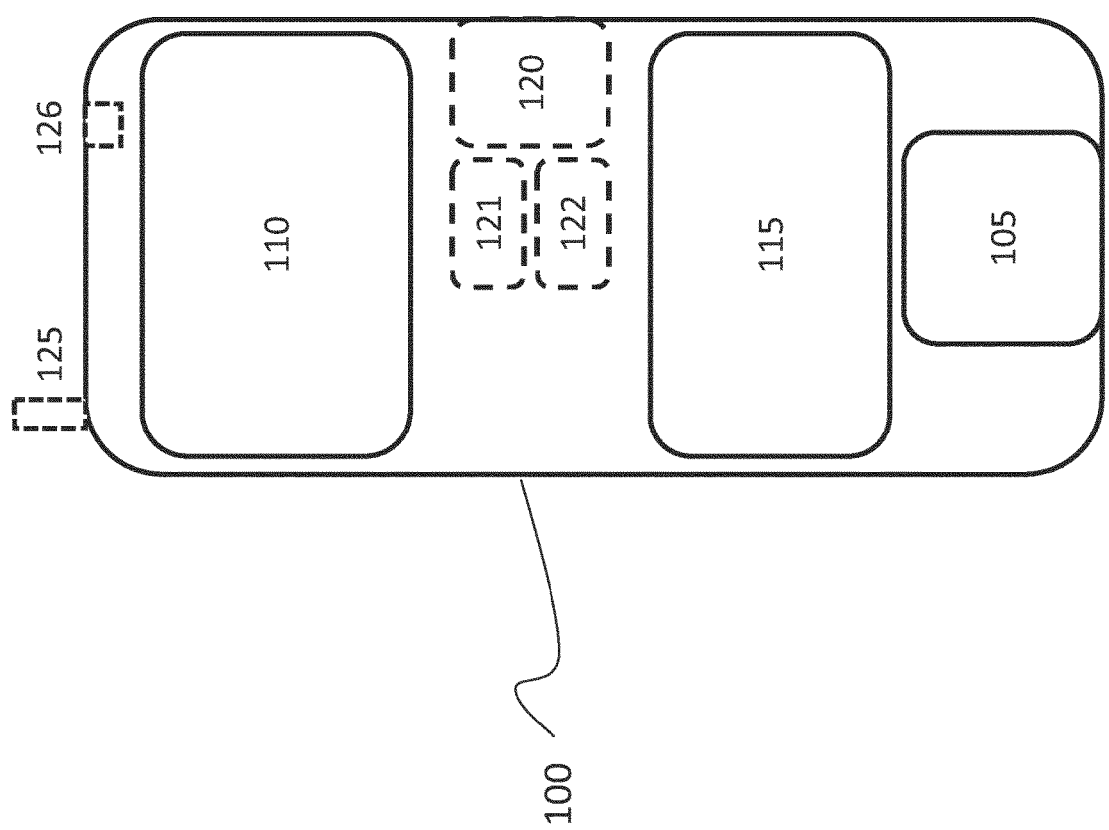

(51) Int. Cl.
- *H04L 9/32* (2006.01)
- *G06F 21/34* (2013.01)
- *H04W 12/06* (2009.01)
- *G06Q 20/08* (2012.01)
- *H04W 12/04* (2009.01)

(52) U.S. Cl.
CPC .......... *H04L 9/3234* (2013.01); *H04L 9/3247* (2013.01); *H04L 63/0442* (2013.01); *H04L 63/0853* (2013.01); *H04W 12/06* (2013.01); *H04L 2209/24* (2013.01); *H04L 2209/64* (2013.01); *H04L 2209/80* (2013.01); *H04L 2463/102* (2013.01); *H04W 12/04* (2013.01)

(58) Field of Classification Search
CPC ............. H04L 2209/24; H04L 2209/64; H04L 2209/80; H04L 2463/102; H04W 12/04; H04W 12/06; G06Q 20/085; G06F 21/34
See application file for complete search history.

(56) References Cited

OTHER PUBLICATIONS

Damme, Gauthier Van, Luyckx, Nicolas, Wouters, Karel; "A PKI-Based Mobile Banking Demonstrator"; Springer-Verlag Berlin Heidelberg, Sep. 2011, pp. 147-158.*

Hamdi Abdurhman Ahmed, Jong Wook Jang; "Document Certificate Authentication System Using Digitally Signed QR Code Tag"; Jan. 2018; IMCOM '18: Proceedings of the 12th International Conference on Ubiquitous Information Management and Communication; Publisher: ACM; pp. 1-5 (Year: 2018).*

Van Damme et al., "A PKI-Based Mobile Banking Demonstrator", Public Key Infrastructures, Services and Applications, Springer Berlin Heidelberg, Berlin, Heidelberg, pp. 147-158, Sep. 15, 2015.

"Mobile Signature Service: Business and Functional Requirements Draft Oct. 16, 2002", European Telecommunications Standards Institute, 650, Route Des Lucioles; F-06921 Sophia-Antipolis, France, No. V1-0, Jan. 20, 2009.

* cited by examiner

QUALIFIED ELECTRONIC SIGNATURE SYSTEM, METHOD AND MOBILE PROCESSING TERMINAL FOR QUALIFIED ELECTRONIC SIGNATURE

CROSS REFERENCE TO RELATED APPLICATIONS

This application is a National Phase filing under 35 U.S.C. § 371 of PCT/EP2013/057312 filed on Apr. 8, 2013. The entire contents of this application are hereby incorporated by reference.

The present invention relates to a Qualified Electronic Signature (QES) system.

The identity of a signer is commonly certified by signing paper documents with handwritten signatures. For reasons of efficiency and practicality today it is often preferable to operate on a communication network, in particular the Internet, in a digital manner. However the user must be identified with certainty to allow the access to sensitive data and to services on a network, payment orders, authorizations and subscriptions in electronic format.

Typically, access to network services takes place by means of the use of a pair of digital identification parameters, such as username and password, known to the user to which these identification parameters were assigned. These identification parameters are also present in a database connected to the network service accessed by the user.

Such solution is vulnerable in terms of security since these parameters can be easily intercepted on the network to take the place of the authorized physical user. Moreover, the presence of these parameters within a database exposes them to a copy made through a hacker attack, with consequent theft and use of the digital identity. The increasing use of network services also multiplies for each user the identifier parameters to remember, representing a usability problem that is not to be underestimated.

A more advanced type of digital identification is represented by the use of OTP (One Time Password) devices. In this case, in addition to username and password, the user is typically in possession of a device which, following interrogation, supplies a code to be added as additional and temporary password valid only for that operation and which expires rapidly. The device calculates this code through an algorithm based on the current time and on an alphanumeric code (seed) saved in the device.

Said alphanumeric code is generally saved also in a central database, with consequent risk of a hacker attack. The home banking systems most widely used today make use of this technology.

The use of OTP devices only partly satisfies a requirement expressed typically by the banking sector according to which, for greater security, the user should be authenticated both through information known to him/her (such as username and password) and through a device possessed by the user. In fact, the OTP device does not actually correspond to something unique possessed by the user, as the information (temporary password) linked to this device is actually information that can be replicated.

Another form of digital identity authentication in the sphere of electronic payments is represented by credit card codes. These codes are relatively easy to copy by expert hackers or more simply in points of sale.

In order to overcome this vulnerability, some e-commerce circuits use a further password and request the reply to further questions concerning additional information of the user, to be able to produce a payment authorization. This is an additional barrier to the user experience and also in this case it is necessary to remember a new password, although without excluding the risks of information being copied by hackers.

Another form of digital identity authentication is represented by the use of PKI (Public Key Infrastructure) technology and electronic signatures based on unprotected private keys.

In these solutions the private key is stored in an area, such as the client file system, which does not usually have a high level of protection, in particular is not certified against extraction of the private key, and therefore copies can be made of the same private key. In the literature, signatures performed through this technology are called electronic signatures and at times digital signatures.

Since, in this case, there is the possibility of making copies of the private key the security of the solution is not totally satisfactory. In fact, the private key is used to implement the signature algorithm ensuring the identity of the signer. If it is copied, the security of the solution is compromised.

Other forms of digital identity authentication use the QES, as defined, for example, in the Digital administration code (Italian Law Decree 30 Dec. 2010, no. 235) and in European Directive 1999/99/EC, usually through the use of client computers where typically it is necessary to install USB token or smartcard devices with related reader.

These devices are certified according to the national and international security levels required to ensure that the private key is impossible to copy. These devices ensure digital identity authentication with a high level of security through the implementation of a QES. The algorithm used is of asymmetric type, to ensure a high level of security.

However, USB tokens and smartcards with related reader must be installed on a client computer and require maintenance. Moreover, in this case identity authentication usually requires the use of a personal computer type processor which, if not portable, limits use in mobility.

Forms of authentication adopting mobile telephones or smartphones as means to ensure digital identity in mobility are also known.

Some of these solutions are based on private keys or digital certificates stored in repositories, i.e. storage modules, which are not certified against extraction of the private key.

Some mobile solutions use symmetric keys for identification, signature and encryption and therefore have a limited level of security.

Other mobile solutions are based on the use of a Security or Secure Element, which is incorporated in the mobile telephone or smartphone and limits the use to specific models, without ensuring the use of certified repositories against private key copy.

In some solutions, the information present in the Secure Element does not correspond to the private key, but to the credit card number or equivalent in cash available for payments from a mobile device.

In some cases the electronic signature process takes place remotely and typically through certified Hardware Security Module (HSM) that are server devices for signature. In this case, to activate the signature process an activation PIN (Personal Identification Number) must be sent through the mobile telephone and/or an OTP device.

Regardless of how secure the channel used to send the activation PIN is, such confidential information is transmitted through a communication network, thereby reducing the security of the solution.

Some solutions are based on the use of the SIM (Subscriber Identity Module) as certified device for QES, but in this case the telephone carrier and typically the banks must reach an agreement on methods, protocols and revenues.

This is because the party that manages the SIM, usually the telephone carrier, is in fact its owner.

This type of solution is described in the paper by Martin Whitehead, "GSMA Europe response to European Commission consultation on eSignatures and eIdentification", GSMA Europe (2011-04-15), XP002683918.

This solution is difficult to put into practice as for a satisfactory user experience the bank offering payment services to the generic user must have an agreement with the user's carrier, as it is unlikely that the user will change carrier or, vice versa, change bank.

This process is not simple to launch on the market due to the number of subjects involved, both on the bank side and on the carrier side.

Some mobile solutions, not based on QES, exclude banks, limiting payments in cases in which telephone carriers can operate autonomously, such as in the case of purchase of digital contents, typically deducting these from the telephone credit.

An object of the present invention is to provide a QES system that overcomes the drawbacks of the state of the art.

According to the present invention, this object is achieved by a qualified electronic signature (QES) system proposed in the following.

A further aspect of the invention relates to qualified electronic signature (QES) methods proposed in the following.

Yet a further aspect of the invention relates to a mobile processing device, such as a smartphone or a tablet or a computer or the like, proposed in the following.

The QES system, according to the invention, allows the signer to digitally sign the requests sent by a requester through the system. In particular, the system allows the signer, as the recipient of a payment request or as the recipient of a subscription request or as the recipient of a secure access request to network services, to operate in security through a QES using a mobile processing terminal, such as his/her own smartphone, tablet or handset computer or computer to wear or the like.

With the term "signer" it is intended, in the framework of the present invention, a person, a company or other physical or not physical recipient provided with an electronic identity and able to sign documents or requests in general, via QES or not QES. In other words, the terms "signer" and "recipient" relate to the same entity.

In general terms, the invention relates to a QES system with digital identity certification, which is implemented on a mobile processing terminal provided with interactive components as a display and a keyboard and provided with wireless communication modules, to produce a QES by the recipient of a request to be digitally signed.

The QES system of the invention is configured to exchange data with the first processing means of the requester.

Said first processing means are configured to allow the requester to generate, through said system, requests related to a signer.

The first processing means may be a generic processing device, such as a smartphone, a tablet, a computer or the like.

The QES system comprises second processing means of the signer configured to allow said signer to sign with his qualified electronic signature.

The second processing means comprise a mobile processing terminal, such as a smartphone, a tablet, a handset computer or a computer to wear or a computer or the like, to produce the QES.

For the sake of simplicity, the present invention will be described in the following with reference to the preferred embodiments in which the second processing means are formed by the mobile processing terminal such as a smartphone or a tablet or a handset computer or the like.

However, in some embodiments of the present invention the second processing means may comprise said mobile processing terminal and one or more further processing devices of different type.

The mobile processing terminal is provided with a display, a physical keyboard or a virtual keyboard obtained for example through a touch screen.

The second processing means comprise a security memory and application means (e.g. a software application stored in the security memory or in another memory location) that are configured to operate with the security memory and to exchange data with other devices.

The mobile processing terminal is in fact advantageously provided with an operating system and includes for the use a security memory and application means (such as a software application).

The application means are installed on this mobile processing terminal or on this installed security memory and are configured to operate with this security memory and to exchange data with other devices.

The security memory is usually installed on a removable medium, which allows it to be housed in a removable manner in the mobile processing terminal to be able to perform, in particular through said application means, the QES operations using the private key of the signer.

Thus, the security memory can be installed on a memory support that can be removed and inserted into the mobile processing terminal in a slot that is different from a slot of the UICC (Universal Integrated Circuit Card)/uSIM (Universal Subscriber Identity Module)/SIM (Subscriber Identity Module).

In fact, the security memory is not an UICC/uSIM/SIM or part thereof, has different shape and dimension, and is independent from the eventual Mobile Network Operator (MNO) chosen by the mobile processing terminal user and from the eventually used Mobile Network like GSM/UMTS Network.

In addition the mobile processing terminal may not be provided with a SIM.

Usually, the security memory can be used in a support (or slot) suitable for a common microSD but it is not a simple SD memory.

The security memory has at least a security partition, which is the security part of the memory and is able to perform QES, keep and protect signature private keys against extraction.

The security memory also has other partitions that are common storage partitions able to store a larger quantity of generic data (typically 2 GB or more).

In this way, the security memory has a storage dimension larger than a UICC/uSIM/SIM.

A security memory like this, called Mobile Security Card, has been recently produced for example by Giesecke & Devrient.

The security memory comprises at least a secure partition in which at least the private key of the signer is stored.

The security memory is different from the Subscriber Identity Module (SIM) and can be activated by the mobile processing terminal in combination with at least an identifier of the mobile processing terminal such as the identifier of an optionally present Subscriber Identity Module of the signer with which the security memory is optionally associated when data are received through a mobile telecommunication network as an example of a wireless network of remote communication, said identifier enabling said mobile processing terminal to receive messages.

The terminal identifier is related to the used wireless network.

The Subscriber Identity Module identifier or phone number can be substituted by another terminal identifier as for example the identifier of the smartphone or tablet or handset computer, able to address push messages to these devices.

These kinds of identifiers are for example available on Android and RIM operating system devices as an additional service for push messages.

Other identifiers for wireless networks suitable for proximity or remote communications are available such as the IMEI, MAC-address or the IP address.

For different wireless networks available to the mobile processing terminal to receive messages, the relevant terminal identifiers may be different. The mobile processing terminal for QES can use an identifier to receive messages, depending on the wireless network used, for example on the basis of the area covered by a wireless network or on the basis of the type of the wireless network used. Terminal identifiers for a given mobile processing terminal in the QES system may be more than one, each terminal identifier being valid for one or more wireless network used to receive request messages.

The mobile processing terminal for qualified electronic signature sends a message for confirmation, as described further, on a wireless network for proximity or remote communications that may be different from the wireless network used to receive or the same as said wireless network. Also to send said message, the mobile processing terminal for qualified electronic signature may choose any wireless network available. The function of receiving messages may be activated by the recipient with the act of moving the mobile processing terminal.

According to an aspect of the invention, in fact, said second processing means (i.e. said mobile processing terminal) are configured so that data are received by said second processing means by moving said second processing means.

The application means of said second processing means acquire movement data when said second processing means are moved.

Said movement data are obtained by means of an accelerometer optionally resident in said second processing means, which calculates acceleration curves depending on time variable on the basis of said movement data.

The application means of said second processing means compare said calculated acceleration curves with pre-configured acceleration curves.

In case of matching between the compared acceleration curves within a predefined tolerance, said application means put the second processing means, for a configurable time, in a listening mode to receive data, or read data by calling an additional intermediate server that temporary stores said data.

In this way, the accelerometer can interpret the movement data in a coded manner to put the second processing means in listening to coming messages.

As a further example of wireless network also not in combination with movement data match, the mobile processing terminal can call a server to read coming messages that were sent by the first means to this server in order to be read by said mobile processing terminal.

The security memory can be accessible also in combination with electronic data received by the mobile processing terminal via proximity networks, by proximity modules on the mobile processing terminal.

The electronic signature is performed in the security partition of the security memory certified for QES and to store the private key in an independent way respect to the mobile telephone service optionally used, to the mobile telecommunication networks optionally used and to the Subscriber Identity Module optionally used.

In particular, the security memory is activated in order to perform a QES on the basis of an activation code inputted by the signer through the mobile processing terminal.

The security memory is used to keep the digital identity of the user independent from Mobile Network Operators (MNOs) and Mobile Network Services, and to reach the security levels required by national and international rules for protecting the private key of the end-user against extraction, in a context of QES, basically being compliant to CC EAL 4+ (or higher) certification and the so called protection profiles required.

The security memory can also be a dongle, with analogous features of a described security memory of SD type, to plug into the audio/microphone socket or an embedded security memory or is included in a Trusted Execution Environment (TEE), i.e. a secure area in the main processor ensuring that sensitive data are stored, processed and protected in a trusted environment.

The mobile processing terminal is configured to be connected to a communication network for the QES, or dedicated network, comprising a specific architecture of server components.

On the QES network, both users requesting requests to be signed using a QES, where each request can be implemented by one or more operation requests in succession, and users receiving operation requests to be signed using a QES, are enabled.

Against one or more operation requests generated by the same original signature request by the requester, only one operation request will reach, after being modified, the recipient for confirmation by means of the QES system.

The QES system according to the invention comprises a dedicated network that manages said operation requests. The second processing means are a mobile processing terminal adapted to receive a request message, related to an operation request, through a wireless network and through proximity or remote communications from such dedicated server network or directly from the first processing means.

The second processing means may be adapted to receive both types of request messages.

The second processing means are also adapted to send a confirmation message (as reply to a request message) through a wireless network (different or coincident with the above mentioned wireless network) that in turn is capable of sending said second data through proximity or remote communications to such dedicated network or directly to the first processing means.

The second processing means can be adapted to send both types of confirmation messages.

The recipient user, enabled to use this QES network through the mobile processing terminal, can use this device, if necessary, in association with an optional supporting processor that can be provided with a larger display.

In any case, the operation to identify the recipient takes place through the mobile processing terminal, in particular smartphone, tablet or handset computer which, by virtue of its typically handheld size, is suitable for operating as identification instrument in mobility, for authorization processes that start on other devices or on the same mobile processing terminal.

The recipient user is reached, through messages, by request messages coming from this dedicated network on the basis of his/her terminal identifier valid on the wireless network used.

According to an important aspect of the invention, a recipient user can also operate in an active manner to perform an original request that requires his/her QES, this request being directed to himself/herself through a request message.

The recipient user can perform these original requests through first processing means or through the mobile processing terminal enabled for the use of the QES network.

Confirmation of the request messages by the user always takes place through the mobile processing terminal.

The requesting user can also be enabled as recipient for use of the dedicated network, or not be enabled for this use, in this latter case operating through the services provided by a network such as payment and subscription requests addressed to third party recipients.

Requests that require QES can be performed, for example, through a software application on the mobile processing terminal, in particular the same application means that manage the certified signature, or, for example, through the browser of a personal computer.

The application means on the mobile processing terminal are configured in general to manage confirmation by means of QES of operation request messages that reach the recipient, after being modified, received after an original request performed by third parties or by the same recipient user.

Original requests of the requesting user are decomposed into one or more operation requests sent in succession, managed and forwarded to a front-end server of the dedicated network, i.e. the initial stage with respect to arrival of said requests, which:

assigns to each single operation request a unique request identifier and a timestamp indicating at least date, hour, minutes, seconds, and interrogates its own database of registered users, within which any recipient user is registered for use of the dedicated network on the basis of his/her telephone number or on the basis of one or more other terminal identifiers depending on the wireless networks and related technologies used by the mobile processing terminal to receive data, comprising information about the form of the message (push message, email, etc.), or on the basis of the identifier of the user for the dedicated server network as a registration code in the QES system to verify his/her rights with respect to use of the dedicated network;

on the basis of the user identified, extracts from the user database information of the user, such as an e-mail address and address references of one or more applicative servers to which the front-end server routes the operation requests on the basis of the type of these requests.

The front-end server is also configured to perform a verification of the correct format of the operation request and of the presence of the terminal identifier of the receiver or his/her identifier, in both cases said identifier being present in the same operation request; the terminal identifier, if present in the operation request, is accompanied by information to associate the terminal identifier with one or more wireless networks or types of wireless networks where the terminal identifier is able to address message requests to the related mobile processing terminal. If the wireless network used to receive and registered for a user is only one it is not necessary to give this information in the operation request. Information on the wireless network used to receive may be present in the operation request.

A software layer for the connection to the dedicated network is installed on the front-end server and on the applicative servers.

The applicative server involved on the basis of the recipient user and on the type of operation request is installed in a body, for example a bank, at which the signatory recipient of the dedicated network is registered.

The applicative server further validates the requests on the basis of the specific format and searches in its own database of users for the presence of the user registered with the information received such as the identifier of the signer for the dedicated network or the terminal identifier of his/her mobile processing terminal identifier on the default wireless network or in the wireless network identified in the request.

In the case in which the check is successful and if the operation request requires to be signed by the recipient, the applicative server sends data containing a text-based request message obtained from the corresponding operation request to the mobile processing terminal of the recipient user.

The applicative server sends to said mobile processing terminal a request message (such as a push message), on the basis of the related terminal identifier which is valid with the (kind of) wireless network to be used (or using the default wireless network), or which can be derived from the received identifier of the signer, said terminal identifier being, among more terminal identifiers which may be associated to said user identifier, valid to address messages to the mobile processing terminal on the wireless network actually used that time; in particular the identifier of the signer represents the identifier of the signer within the system.

The applicative server chooses the kind of wireless network or the wireless network, if many, on the basis of a re-configurable default or on the basis of additional information present on the request. Once chosen the wireless network, the terminal identifier to use, among possible many, is derived by consequence.

Upon receiving the request message requesting signature, the application means on the mobile processing terminal automatically interpret it by extracting a text—based information that the application means visualizes on the display of the mobile processing terminal through a graphic interface so that the user can confirm or reject this request, through signing with a QES of the recipient user.

This signature is a QES of the data specifically received by means of the text-based information extracted from the aforementioned request message.

The recipient user, eventually after having verified the information displayed on second processing means matches with information displayed on first processing means display (avoiding in this way man in the middle or man in the browser hacker attacks), enters a signature PIN code to confirm signing through QES activating the security memory. This signature PIN code is not transmitted on the dedicated network or other network, but is used only to activate the signature locally.

The QES system allows digital subscription, via the mobile processing terminal provided with security memory, of the following types of text-based data extracted from corresponding request messages, each through management of the corresponding operation request received requiring signature:

payment (optionally integrated with advertising) document subscription access to websites or network services or physical areas or cash withdrawal at an ATM (Automatic Teller Machine), or in general operations or actions to be confirmed; without losing generality access includes all these concepts.

The recipient user can apply, through the mobile processing terminal, a QES with the private key.

The mobile processing terminal is also able to visualize notifications and send confirmation of receipt of the notification and is preferably also configured to allow requests for the aforesaid operation types to be performed actively.

The QES is applied to the information to be subscribed, in particular by applying an encryption through the private key on a hash string calculated on the text-based information extracted from the request message received onto the mobile processing terminal or by encryption on the hash contained in the message.

In the case of payments and accesses, the information to be subscribed is differentiated each time from the previous ones, as it is associated with at least one unique variable part added by the front-end server of the dedicated network to which the requesters send the original requests; the variable part includes, at least, a unique identifier and indication of the timestamp of implementation of the operation request.

The fact that the signature requested must always be different prevents problems in the case in which it is copied by hackers; the same signature cannot confirm another request.

Instead, in the case of document subscription, advantage is taken of the fact that the documents are generally different each time, at least for a given recipient user, and therefore the information to be subscribed also varies.

In the case of substitution of the QES with that of another subject, the signature verification system, with which the applicative server is provided, would detect that said signature was signed by a different party than the correct recipient.

Due to the use of the security memory, the private key is protected against copy and extraction.

The encryption algorithm used for the QES is the RSA algorithm, which is of asymmetric type; the QES is the electronic signature considered to have a high degree of security, such as to be legally equivalent to the handwritten signature in many national legal systems.

Identification of the user enabled on the dedicated network, in response to an operation request requiring a signature, takes place by sending from the mobile processing terminal a QES in detached form, separate from the certificates and, in the majority of embodiments, separate from the plain text message to which it refers.

The recipient user of the dedicated network can access exclusively, with his own identity, the operations that can be performed through the application means on the mobile processing terminal, as the QES that activates them can only be performed through the security memory associated with the mobile processing terminal.

In said security memory resides the protected private key of this user resides, unique in this network, as it relates to a public key that is unique within this network and registered there together with the qualified certificate containing said public key.

Moreover, the PIN code for activation of the signature is known only to the user in possession of the private key and is not information replicated within the system.

The PIN code for activation of the signature can only be interpreted by the security memory, but is not deducible from it.

Therefore, the password or plurality of passwords sent on the network, usually used to access specific services/bodies, is/are substituted by the use of a single PIN code in the smartphone or tablet or handset computer, not transmitted on the network.

According to a further aspect of the invention, the applicative server, after sending the request message from which to extract the text-based request information to the mobile processing terminal, waits for a configurable time to receive the QES from the mobile processing terminal.

If this time has not expired, upon arrival of the confirmation message containing said QES, the applicative server verifies the signature.

On the basis of the type of request signed, the applicative server performs transactions integrating other services of the body hosting the applicative server.

For example, in the case of payments it is typically hosted at the user signing's bank or in the payment gateway used by the website or by the merchant from which the user signing is buying.

In this way, the user's sensitive information to perform the payment (for example, credit card number) is typically present only within the bank or payment gateway, to the advantage of security.

More in general, adoption of the system by a body/service, through the typically internal use of the applicative server layer, allows the body and its clients to certify the identity of the user without user's sensitive data being transferred on the network.

According to a further aspect of the invention, the applicative server receives feedback on the transaction from the services of the body and sends it to the mobile processing terminal of the recipient user.

The applicative server updates the status of the operation on the front-end server on the basis of the unique identifier of each operation request.

Any different operation requests originating from a same original request is linked through the presence of the identifier of the previous operation request in the subsequent operation request.

Said status reaches the requester through the first processing means used by him/her for the original request.

The network for the digital signature through this front-end server sends notification to the requester via e-mail, if the corresponding address is present in the request data.

If the requester is registered in the dedicated network and provided his unique identifier within the dedicated network in the original request, he/she receives a notification message on the status of the operation on his enabled mobile processing terminal.

According to a further aspect of the invention, for each original request, the user, who received a request message, also receives a notification e-mail, in addition to said message.

According to a further aspect of the invention, on the side of the front-end server, the validated QES are enveloped together with the plain text information, with the signature certificate and with the certificate of the Certification Authority that issued the signature certificate.

If said information is a document, and in particular a sales invoice, an electronic invoice is thus produced through the signature.

The documents and the request messages subscribed are stored digitally on the storage servers of the dedicated network according to the legal digital storage process of the country of use, for example in Italy called "Conservazione Sostitutiva" (Electronic Storage).

Preferably, a legally valid timestamp is associated with these signatures.

These documents can be consulted, verified and visualized by the user through a specific service of the dedicated network.

According to the invention, a qualified electronic signature (QES) method is described. The method comprises the operations implemented by the QES system described above.

According to a further aspect of the invention, the method also comprises:
  using a temporary password (ATP) displaying a not hashed base string (defined further) or a hashing of the base string and the temporary password on the second processing means of the signer;
  displaying the not hashed base string or the hashing of the base string and the temporary password on the first processing means of the requester.

Further the method comprises the procedure, performed by the applicative server, of computing the not hashed base string or the hashing of the base string on the basis of the information of the request and of the temporary password (ATP), and of further information comprising a session identifier on the interface server corresponding to the identifier of the request.

According to the invention, a mobile processing terminal for QES is described.

The mobile processing terminal is adapted to receive data containing text-based communications at least on a wireless network suitable for remote communications, such as mobile telecommunication networks, or Wi-Fi connection reaching the Internet, or on a wireless network suitable for proximity connections such as Near Field Communication or Wi-Fi communications in a Local Area Network.

The mobile processing terminal receives data on the basis of at least one terminal identifier valid at least on a wireless network to address messages to the mobile processing terminal.

The mobile processing terminal comprises an operating system and application means for operating with a security memory, which comprises at least a secure partition in which at least the private key of the subscriber is stored, said security memory having the technical features described above.

The mobile processing terminal is configured to send messages at least on a wireless network suitable for proximity or remote communications, through a dedicated software application (application means) executed in the operating system, to use the private key in the security memory and to sign a QES by encryption of a request message or its data or parts thereof by means of the private key.

The mobile processing terminal is able to operate the electronic signature in the security partition of the security memory by keeping the private key in an independent way with respect to the mobile telephone service optionally subscribed, to the mobile telecommunication networks and to the optional Subscriber Identifier Module, on the basis of an activation code inputted by the signer through the mobile processing terminal.

The mobile processing terminal is able to send said signature at least through a wireless network suitable for proximity or remote communication, different from the wireless network used to receive the message request or the same as this latter wireless network.

Figure 2:
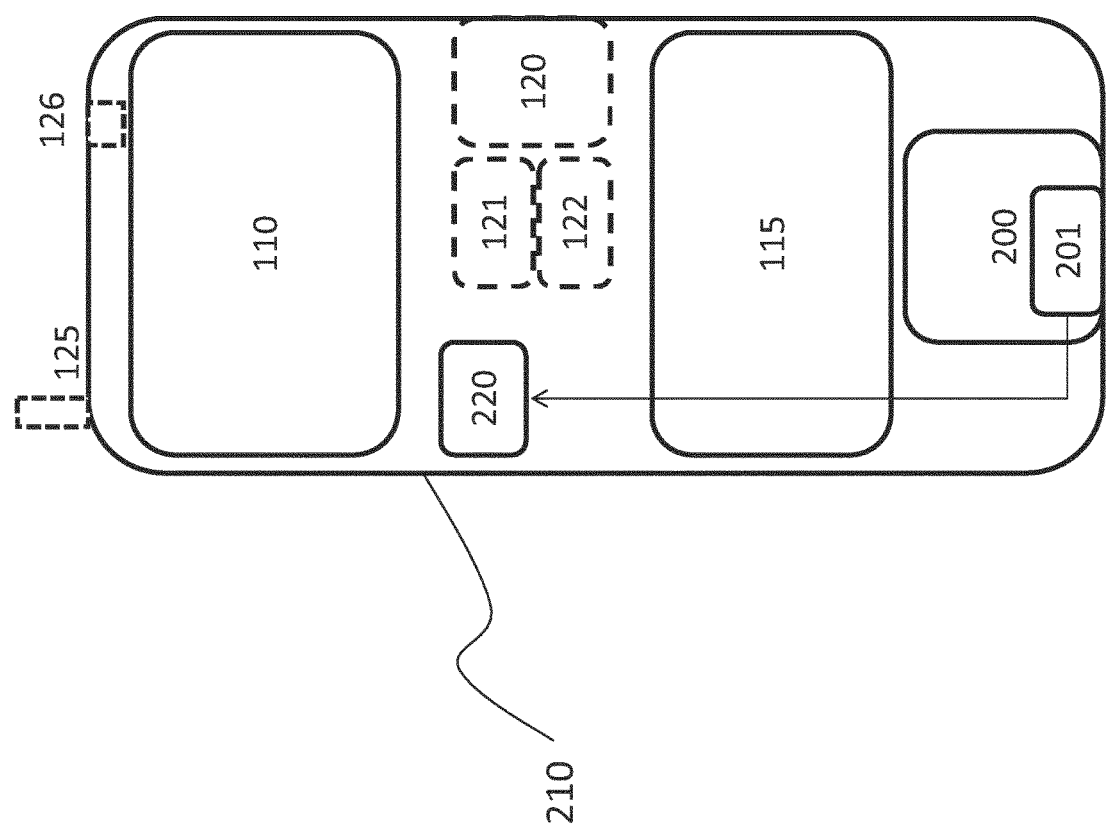
Figure 3A:
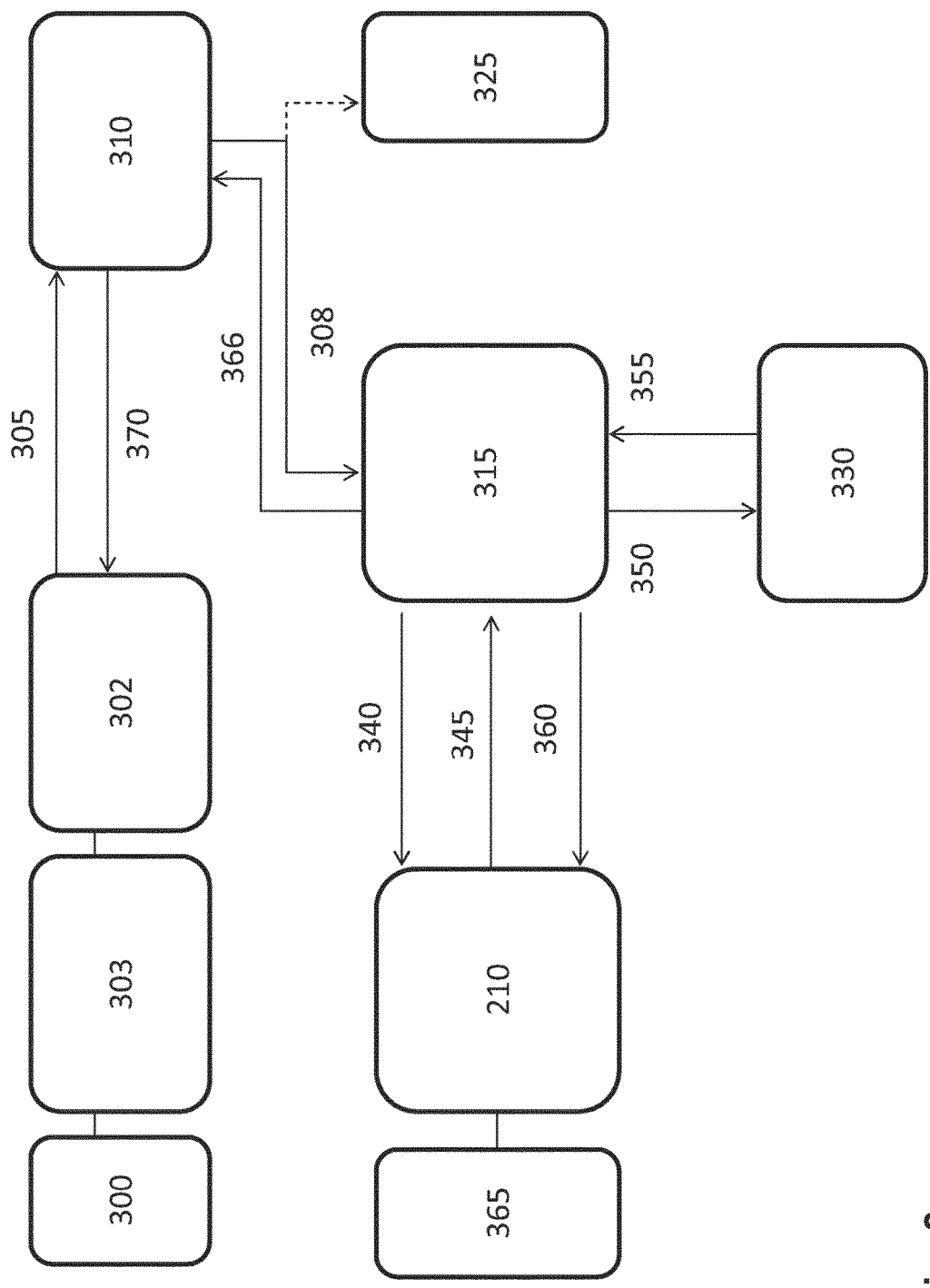
Figure 3B:
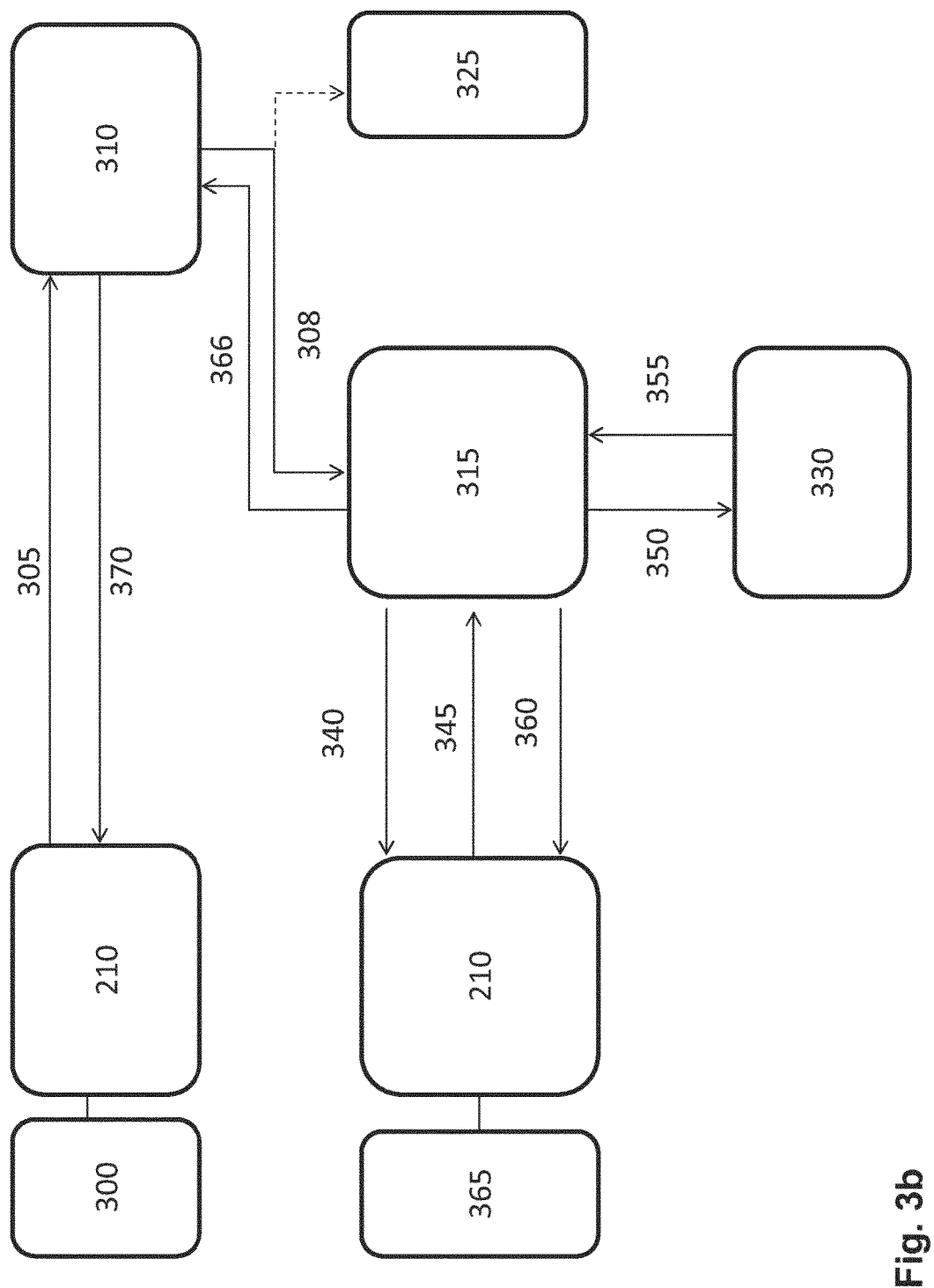
Figure 4:
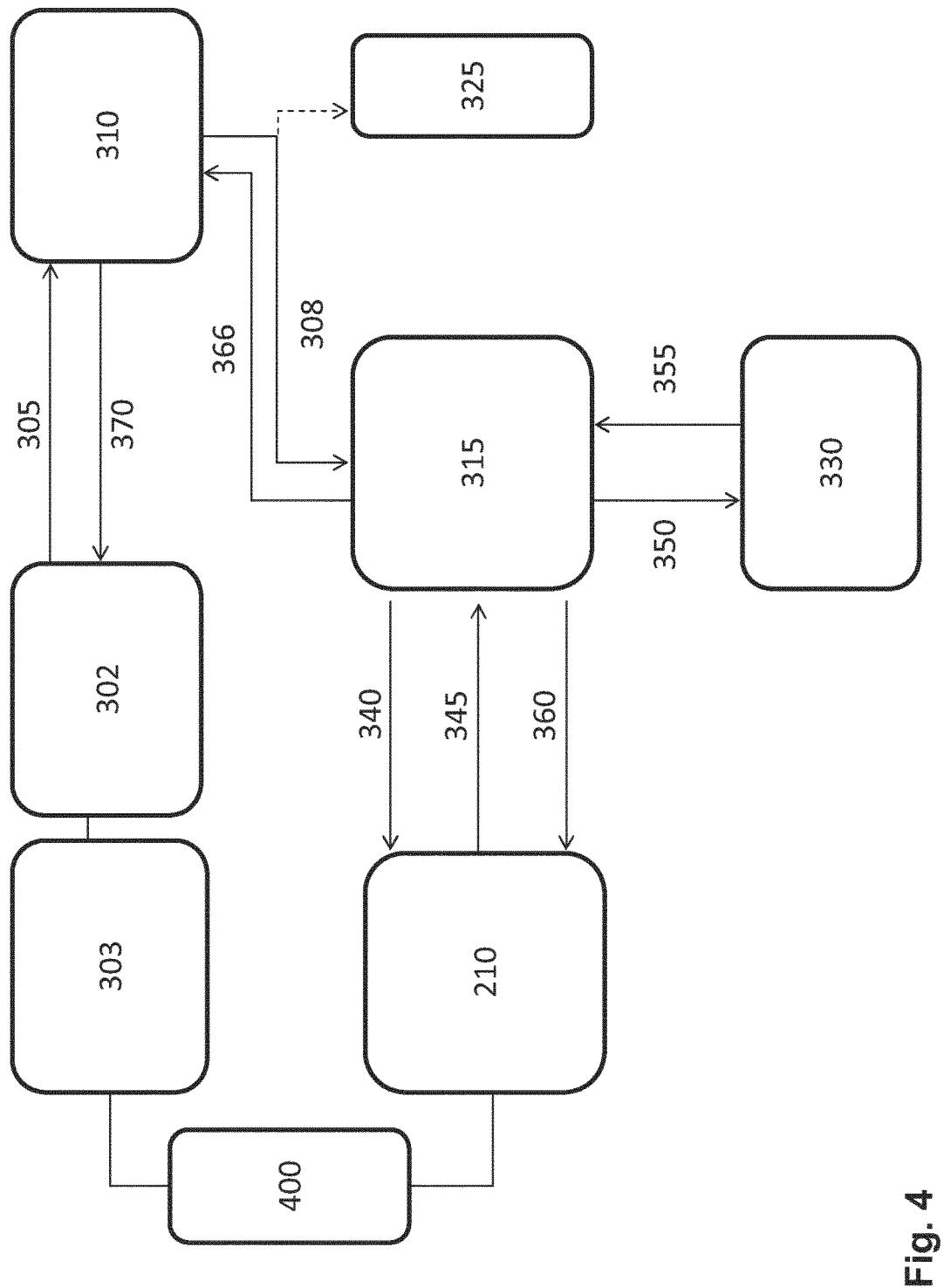
Figure 5:
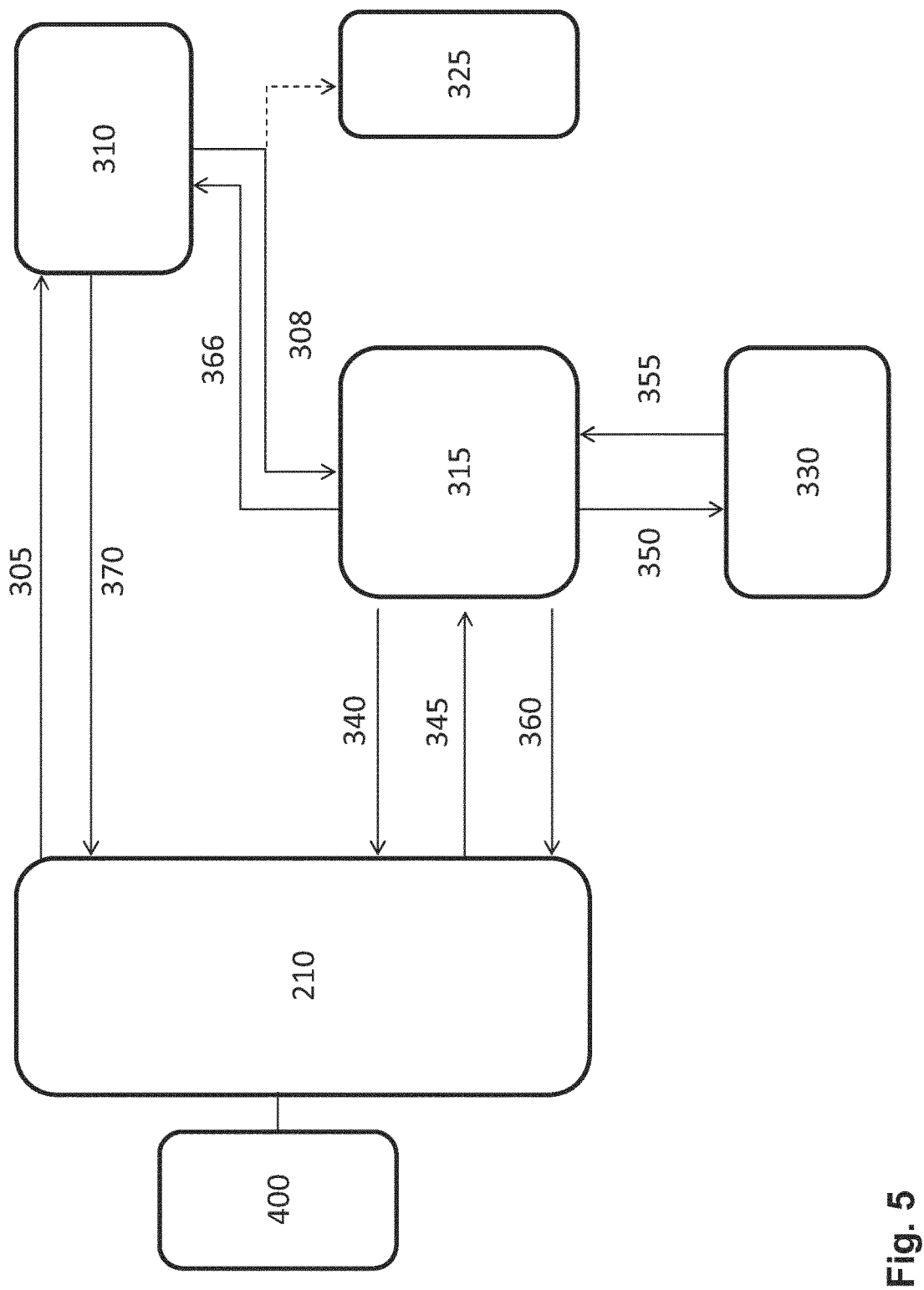
Figure 6:
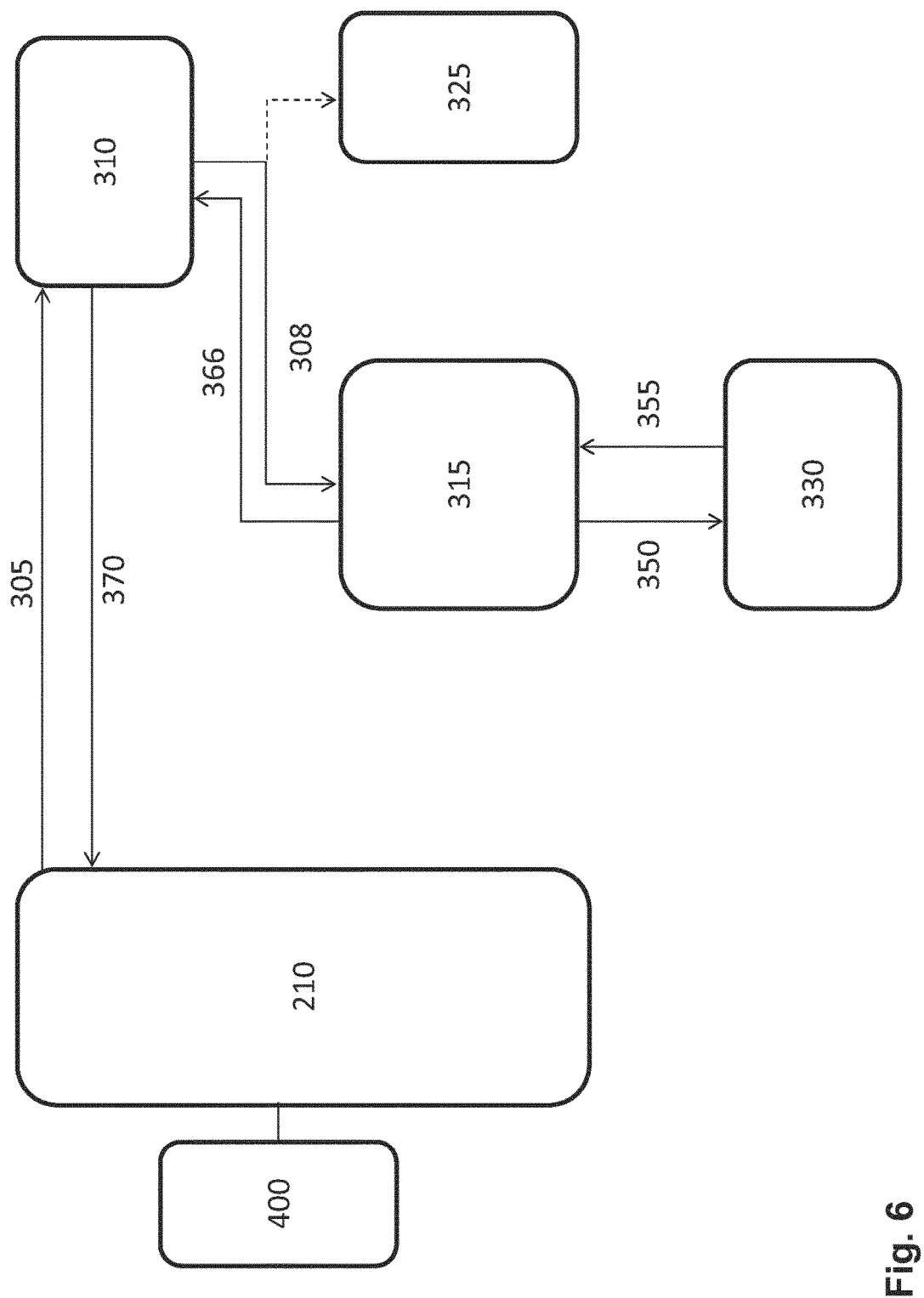
Figure 7:
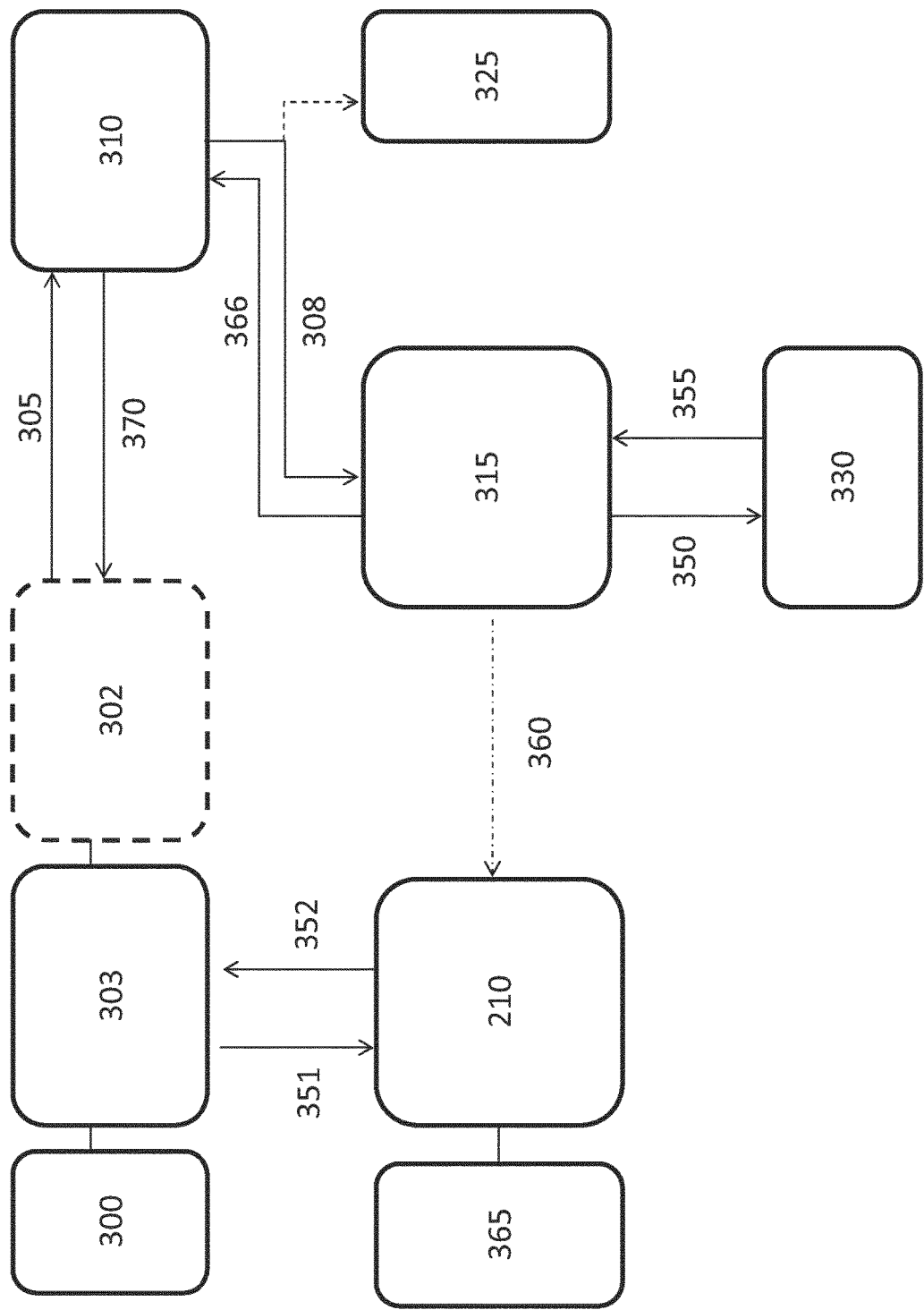

Further characteristics and advantages of the invention will be apparent from the description below with reference to the accompanying drawings, provided purely by way of non-limiting example, wherein:

FIG. 1 schematically represents a conventional mobile processing terminal;

FIG. 2 schematically represents a mobile processing terminal according to the invention;

FIG. 3*a* schematically represents a first architecture of the QES system according to the invention;

FIG. 3*b* represents a second architecture of the QES system according to the invention;

FIG. 4 schematically represents a third architecture of the QES system according to the invention;

FIG. 5 schematically represents a fourth architecture of the QES system according to the invention;

FIG. 6 schematically represents a fifth architecture of the QES system according to the invention;

FIG. 7 schematically represents a sixth architecture of the QES system according to the invention.

Figure 8:
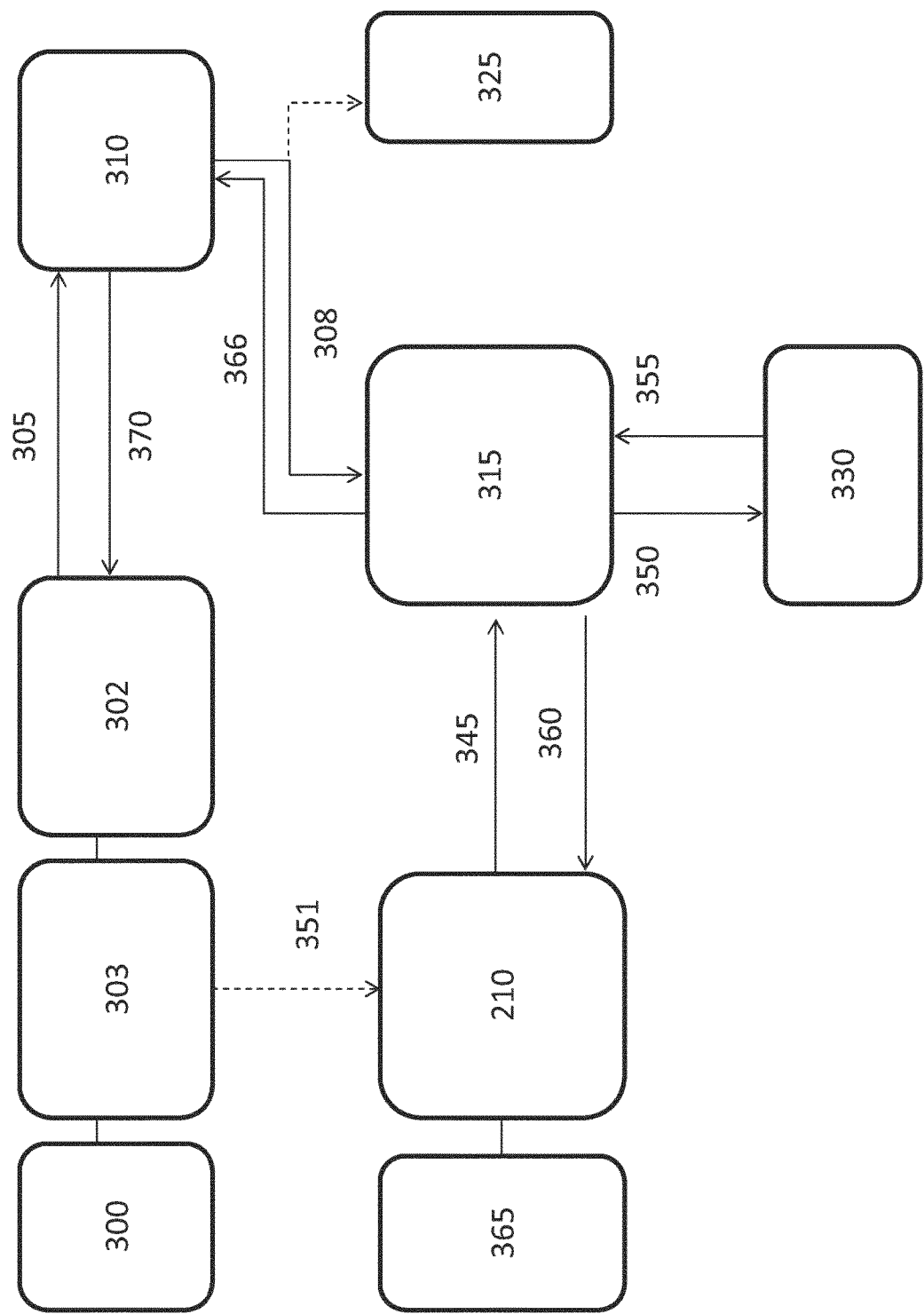

FIG. 8 schematically represents a seventh architecture of the QES system according to the invention.

Figure 9:
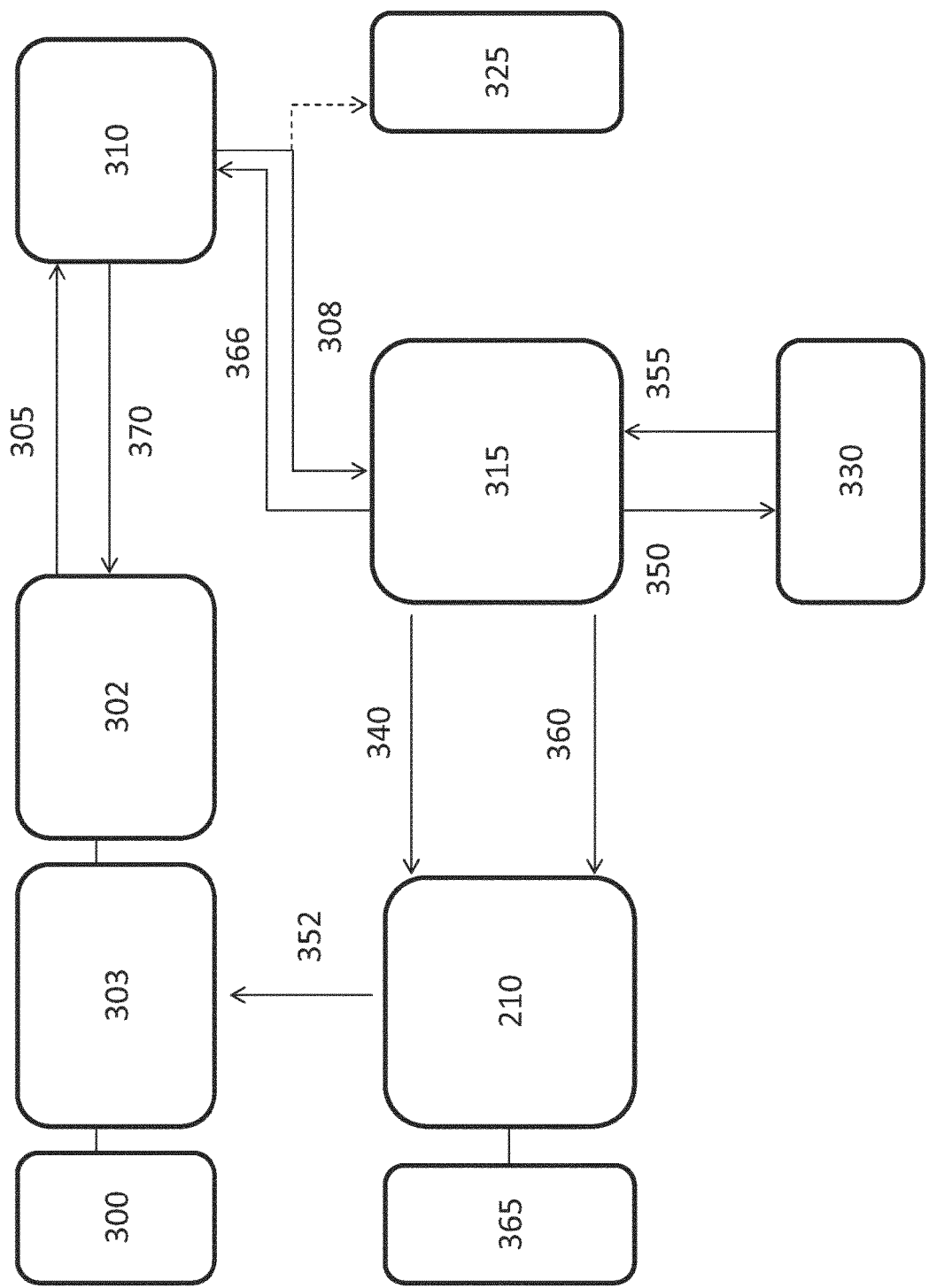

FIG. 9 schematically represents an eighth architecture of the QES system according to the invention.

Figure 10:
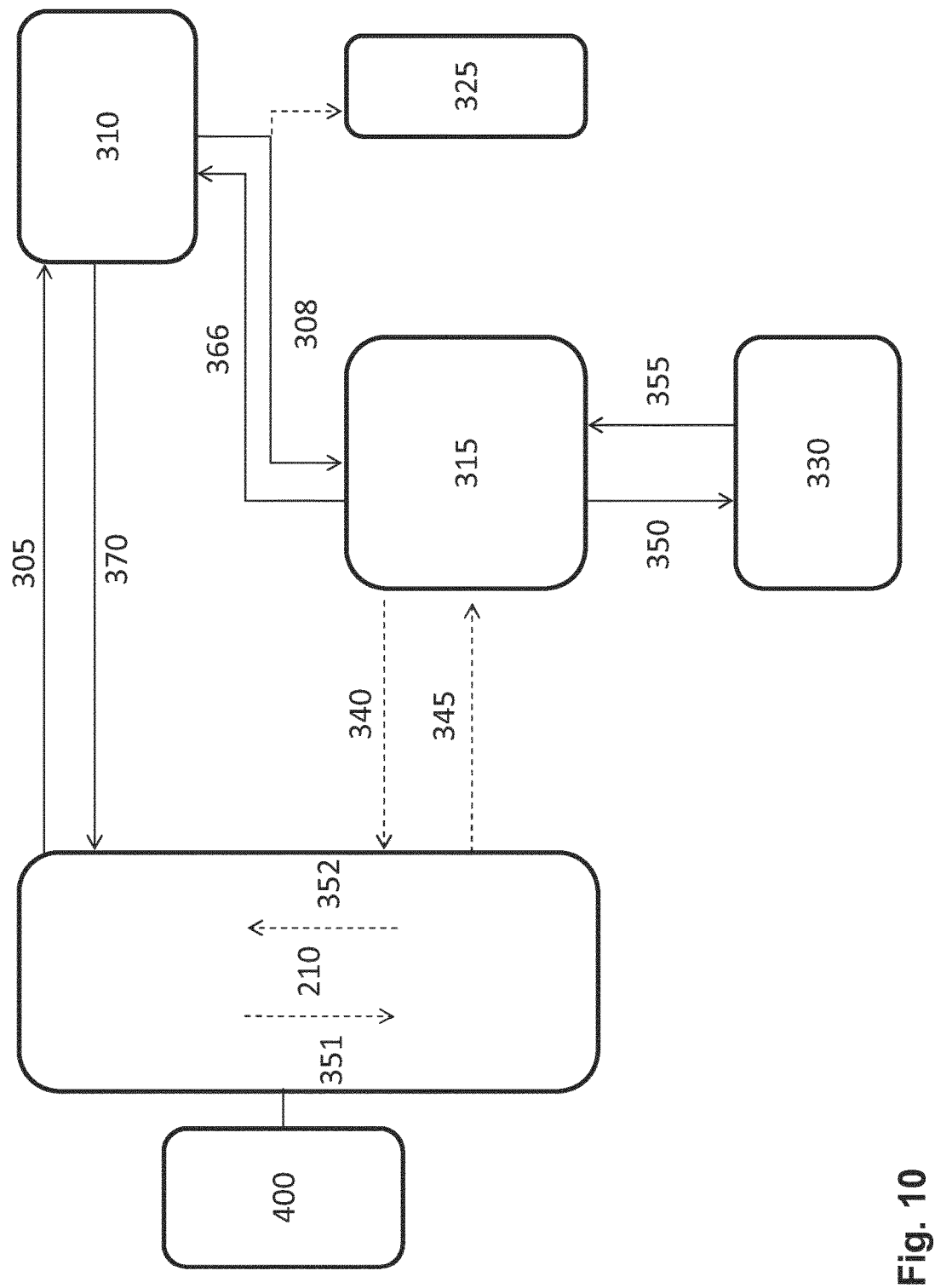

FIG. 10 schematically represents a ninth architecture of the QES system according to the invention.

The qualified electronic signature (QES) system according to the invention is now described in detail.

The QES system, according to the invention, can exchange data with first processing means 100, 303, 210 of a requester to allow said requester 300, 400 to generate a system request 305 related to a recipient (also signer in the present description) 365, 400.

The operation request 305 requires a QES of said signer or contains said QES.

The QES system, according to the invention, also comprises second processing means 210 configured to allow the signer 365, 400 to sign with the QES.

The second processing means comprise at least a mobile processing terminal 210, such as a smartphone or a tablet or a handset computer or a like.

The second processing means (i.e. the mobile processing terminal 210) can receive data at least through a wireless network for remote or proximity communications, and can send data at least through a wireless network for remote or proximity communications, different from the wireless network used to receive or the same.

Remote communications typically connect said terminal to a device through a communication of long distance, either the device is far in respect to it, either the device is in its proximity.

Proximity communications typically connect said terminal to a device through a communication of short distance, with the device that is near the terminal.

FIG. 1 describes a known example of mobile processing terminal 100 such as a smartphone or a tablet or a handset computer 100, provided with an operating system for the execution of software applications.

The mobile processing terminal 100 is provided with a display 110, a touch or physical keypad 115, a memory card 105 of microSD (micro Secure Digital) type housed in a corresponding reader of the terminal 100.

The mobile processing terminal 100 can receive messages at least on a wireless network suitable for remote communications, such as a mobile telecommunication network, through a wireless connection module 125 to the telecommunication network for receiving SMS or data over the Internet.

The mobile processing terminal 100 can also receive messages on other wireless network for remote communications through the wireless module 122 on the mobile processing terminal and a Wi-Fi spot able to reach the Internet or extended Local Area Networks receiving e-mails or push messages or other types of data that can be used for example in place of SMS text messages.

The mobile processing terminal 100 can also receive data through a wireless network for proximity communications through the wireless module 122 on the mobile processing terminal and a Wi-Fi spot able to reach a Local Area Network.

The mobile processing terminal 100 can also receive messages through a wireless network suitable for proximity communications through a connection module 121 present on the mobile processing terminal for proximity communication based on technology such as Near Field Communication (NFC), Bluetooth, barcode, QR-code, Rfid.

The mobile processing terminal 100 can also send messages at least on an analogous wireless network suitable for remote or proximity communications, said two networks being different or coincident.

In order to send data, the mobile processing terminal may use communication modules or wireless networks for remote or proximity communications of the same type as those available to receive data.

In QR-code based wireless network data are exchanged by reading a QR-code image through a digital camera on the mobile processing terminal or the QR-code is displayed on display 110 on the mobile processing terminal and read by another device.

In addition when QR-code is fixed, such QR-code can also be present on the back of the mobile processing terminal or on a related cover.

The mobile processing terminal 100 can also comprise a SIM (Subscriber Identity Module) 120. For brevity we will refer to a SIM including the uSIM as a particular case of SIM.

It is mandatory to include at least the module 121 or 122 or 125, in said mobile processing terminal.

If a wireless connection module 125 is present, the mobile processing terminal 100 normally also comprises the SIM 120.

The layout of the elements of which the mobile processing terminal 100 is composed depends on the model.

In particular the module 122 can enable wireless networks suitable for proximity and remote communications.

In order to send data, the mobile processing terminal can use wireless networks for remote or proximity communications through related modules coincident with or similar to those used for receiving data that have been described above.

Among considered wireless networks for remote or proximity communication, some may include additional intermediate servers that the mobile processing terminal 100 calls to receive data, and/or send data, said intermediate servers temporary storing said data; other devices in analogous way can call the same intermediate servers in order to communicate with the mobile processing terminal 100.

Audio/microphone socket 126 is an optional module and is commonly used to connect the terminal to headphones and similar devices.

Some numbered modules in the terminal of FIG. 1 may physically collapse in one module when this latter covers more functions.

Shapes and size of the mobile processing terminal 100 and of each of its components depend on the producer and on whether the terminal is a smartphone or a tablet or a handset computer. The mentioned first processing means may comprise a mobile processing terminal 100 like the one described above.

FIG. 2 represents the mobile processing terminal 210, which is configured for use in the QES system according to the invention.

The mobile processing terminal 210 is structured similarly to the mobile processing terminal 100.

Differently from the terminal 100, the second processing means 210, in particular the mobile processing terminal thereof, comprises a security memory 200 in place of the memory card 105.

Moreover, the mobile processing terminal 210 for QES is configured to interact, in reading and if necessary in writing, with this security memory 200 through a specific QES application (application means) 220.

Said application means are for example implemented as a software program suitable for being executed in association with the operating system of the mobile processing terminal 210, which configures the mobile processing terminal 210 to produce the QES in accordance with the system and method according to the invention.

The QES application (application means) 220 is preferably multi-functional and can therefore process all or part of the different types of text messages for payment requests (optionally integrated with advertising), document subscriptions and accesses, such as web or physical ones or to network services including money withdrawals at ATMs or other actions executed after the signer confirmation.

This qualified electronic signature application 220 can be loaded, as in FIG. 2, in the mobile processing terminal 210 for QES.

The application means 220 can also be installed in the same security memory 200 or already be installed on this, ready for use by the user.

The mobile processing terminal 210 for QES is therefore used for the qualified electronic signature and consequent identification of the user within the QES system according to the invention.

The mobile processing terminal 210 for QES corresponds in general to the conventional smartphone, or tablet or handset computer 100, but it is provided with a security memory 200, preferably removable, in a corresponding microSD (Micro Secure Digital) memory reader.

The security memory 200 as well as allowing storage of common data in general, such as photographs or music, also comprises a partition certified according to the level of security required by national and international regulations for QES and for protection of a private key 201 stored in this partition.

For example, for European Union countries, this level of certification required is fundamentally the Common Criteria EAL4+ (or higher), depending on the "protection profiles" required.

These certified memories differ from SIM cards, for example, due to the fact that they are independent from the eventual telephone carrier and have different shape and size.

In fact, a smart card or a SIM card stores a limited quantity of data, has different shape and size from the security memory, and cannot be housed in a microSD reader.

In addition to being able to be housed in this reader and having the size of a microSD, besides having a noteworthy capacity, for example 2 GB, the security memory 200 is suitable for containing a secure partition for execution of the QES and for storage of the private key 201. The security memory 200 can therefore fulfil both the normal functions of a common microSD card for storing large quantities of data (navigator maps, photographs or other data), and functions related to the QES.

A similar security memory, was recently produced.

It is important to notice that the security memory 220 can be used in combination with a telephone number (or a subscriber identifier) encoded in the optional SIM 120, or other identifier of the terminal for at least one wireless network, said identifier provided for example by additional services such as push messages of operating system providers that are able to address messages to the second processing means on the basis of said identifier at least on one wireless network available.

As the optional SIM 120 and the security memory 220 are removable, the user can use these elements together on other second processing means 210.

The identity of the signer is in any case guaranteed by the QES as the QES signed by the user adopting the security memory 200 is in any case verifiable, allowing subsequent checking of whether a data message was signed by the private key 201 associated, even if unknown, with the certificate corresponding to the recipient user.

By consequence, the identifier of the mobile processing terminal 210 on the wireless networks, used by the terminal to send data, may not be present in descriptions of embodiments as not crucial to understand the sender of messages sent by the mobile processing terminal; in any case additional identifiers of the mobile processing terminal 210 on the wireless networks, used by the mobile processing terminal 210 to send data, are possible or needed in some of said wireless networks, but in any case are a technical detail.

If the terminal identifier or one of the terminal identifiers changes or is added, such as the phone number, for a given signer, he/she can update his registration in the dedicated network with relevant wireless network information related to said identifier.

A QR-code or barcode indicating for example the identifier of the user in the QES system or the terminal identifier can also be present on the back of the mobile processing terminal or on an optional related cover. It can be read by first processing means through a camera.

Optional audio socket 126 can be connected to a dongle certified for QES, instead of using said security memory microSD.

Also other secure elements embedded or not embedded or connected to the mobile processing terminal 210 or its parts can be used instead of said security memory microSD.

Another requirement for the QES resides in the use of a signature certificate containing the public key which is issued by a Certification Authority (CA), which is a government body or is recognized by this latter.

Digital certificates of this type are used for the QES within the QES system.

To obtain a certificate of this type, it is normally necessary for a manager (registration operator) authorized by the Certification Authority (through a Registration Authority) to carry out a de visu recognition of the user to whom the certificate is to be issued to legally guarantee his identity.

Technically equivalent digital certificates can also be used, issued by bodies belonging to the same dedicated network but that do not issue QES certificates.

In this latter case, the same process and technological requirements are in any case guaranteed, both in relation to the certifications on the security levels required on the process, and on the signature and protection devices of the private key 201.

In this latter case, the signature performed is not actually a QES but a signature defined here as equivalent QES.

According to the difficulty or suitability of issuing the qualified signature certificate in the narrow sense, the user can decide whether or not to opt for an equivalent QES, which in any case (from the viewpoint of security) is in practice equivalent and therefore satisfies the same technical requirements of security established by international provisions for the QES.

If the user requires enforceable validity with full legal value he/she must opt for the QES in narrow sense.

Hereinafter the term QES will also be extended to indicate the equivalent QES, if the user opts for this latter.

Certificates issued by different Certification Authorities, also of different countries, are used within the QES system according to the invention.

When registering the user in the dedicated network, a check is done to ensure that the public key of the certificate is unique within the QES system, according to the invention.

If it is not, it is necessary for the user to have a new couple of private and public keys to issue the certificate, regenerating a new private key 201 and public key.

The signature on the security memory 200 can be activated by means of a respective PIN code that enables the signature through the private key 201, while the public key and the corresponding qualified certificate can also reside in an unprotected area of the security memory or of the mobile processing terminal.

The PIN code is used exclusively on the terminal by the user to implement QES or, if necessary, asymmetric decryptions, without this PIN code being transmitted on the dedicated network or other network.

The operation to change the PIN code is available to the user at all times and involves only the same user, through the use of the QES application (application means) 220 or the basic drivers of the security memory.

The user registered in the QES system proposed is provided with the second processing means 210 for QES with protected private key 201 present in the security memory 200.

The private key 201 is combined with a qualified signature certificate related to the same user and to the related signature certificate of the Certification Authority that issued this certificate. The user is registered in the QES system, for example indicating during the registration phase his/her terminal identifier or terminal identifiers (including the type of each identifier and/or the related wireless networks or the types of said wireless networks where each identifier is valid) such as the telephone number and/or the push message identifier and/or IMEI within this QES system, optionally the identifier of the user for the QES system, at least an address/reference of an applicative server for each type of request that the user intends to manage (payment, subscription, access) and, if necessary, the e-mail address. This information is registered in the front-end server 310 or in a database connected thereto. If the user registers without a user identifier, terminal identifiers and related information about relevant wireless networks are present on Front-End server 310 and on applicative servers to which the user is registered, otherwise if the user registers also with his/her user identifier in the QES system, the terminal identifier or terminal identifiers and related information on the related wireless networks may be registered only on the applicative servers to which the user is registered and not in the front-end server 310. The identifier of the user, if existing for a given user, is on both, the front-end server 310 and the application servers to which the user is registered.

Other information required for registration of the user in an applicative server 315 is the qualified signature certificate and the certificate of the Certification Authority that issued it. In each applicative server 315, the services of which are used by the user, these certificates are registered in relation to the terminal identifier and/or terminal identifiers of the mobile processing terminal 210 and information about respective wireless networks to send messages to it, if necessary his email and the possible identifier of the user within the dedicated network. The front-end server 310 and the applicative server 315 are described with reference to the diagrams in FIGS. 3a, 3b, 4, 5, 6, 7, 8, 9, 10, which exemplify embodiments of the architecture according to the invention.

Different embodiments of the QES system according to the invention are represented through examples illustrated in the schematic diagrams of FIGS. 3a, 3b, 4, 5, 6, 7, 8, 9, 10. In these schematic diagrams, common components of the QES system proposed are indicated with the same reference numeral.

Said common components are represented, for example, by an interface server 302, the front-end server 310, the applicative server 315 of the recipient and a server body of the recipient 330. Other data related to the signer may be present on the applicative server 315, depending on the service provided.

The applicative server 315 is the sample but also applicative server 325 and others for example may contain such data of the signer. Servers can each reside on a different physical server or can be allocated on a different number of physical or virtual servers.

For example, all components could reside on only one server, while each of the aforesaid servers could actually correspond to a cluster of servers.

The messages exchanged between the servers on the network that forms the QES system according to the invention are preferably encoded with base64 encoding or hexadecimal format, or with another method that prevents loss or alteration of information during transmission.

Communications between the different servers are not necessarily produced through a wireless communication network.

The same can be said for communications between the interface server 302, where present in the described examples of embodiment, and the client (first processing means) of the requester.

In the case of transmission in which another response message corresponds to a message, although without limiting the present embodiments to this type of transmission, following a message sent to a server, the agent (the client of the requester or one of the servers) that sent it waits for a response message within a predefined timeout.

The response can be of synchronous type (e.g. TCP/IP) or asynchronous type, adding an identifier to the response message to allow the calling agent to correlate it to the message previously sent by this latter.

The embodiments described herein preferably refer, in a non-limiting manner, to the synchronous case for these messages.

Moreover, if a message is of a certain type (e.g. QR-code exchanged through proximity communications) the corresponding received message can be of a different type (e.g. internet traffic data exchanged through remote communications).

The messages exchanged by a smartphone or tablet or handset computer 100 with the interface server 302 and by the second processing means 210 with the front-end server 310 may therefore be, by way of non-limiting example, asynchronous wireless of SMS (Short Message System) type or Internet data through module 125.

If using the optional wireless connection module 122, they can, for example, be transmissions with generic Internet or Local Area Network data traffic.

Analogously, again in a non-limiting manner, the messages exchanged by the mobile processing terminal 210 for QES with the applicative server 315, where present, can be considered asynchronous.

For example, with reference to FIGS. 3a, 3b, 4, 5, request messages 340 received by the mobile processing terminal 210, confirmation messages 345 sent by this latter (for these latter the response of the server being of recipient status type 360) may be SMS text messages or push messages or other type of messages, each of said messages being transmitted on the same wireless network used by one or more of the other said messages or a different wireless network, with proximity or remote communication.

It is also possible to consider, for example, that the confirmation messages 345 are calls made through the optional wireless connection module 122 that in this case typically are, but not limited to, remote communications, for example e-mail sent through the e-mail field of the recipient in the user database of the applicative server 315.

The confirmation messages 345 may also be Internet data traffic calls to web services exposed by the applicative server 315 with response by this of recipient status type 360.

It is also possible to consider that messages 340 and/or 345 and/or 360 are exchanged on a wireless network suitable for proximity communications.

In general said messages 340, 345 and 360 are stored on the partition of the security memory 200 that is different from the security partition, in order to show the history of these messages to the user in an intelligible way.

This partition, of big size type, can be also used by other applications like, for example, photographs and movies applications.

In the case in which the mobile processing terminal 210 is provided with optional wireless connection module 122, the SMS text message sent for the request message 340 can be substituted, for example, by analogous electronic data containing a text-based request message 340 transmitted as data traffic via a Wi-Fi spot over the Internet or Local Area Network, or on a wireless network for proximity communications in case of presence of module 121 in the mobile processing terminal 210.

In this context, the mobile processing terminal 210 can listen, for example, on a specific port, through the application means 220, for any aforesaid request messages.

After receiving a message, the application means 220 send an additional receipt message to the applicative server if the model of the messages requires this.

With regard to message request 351 and/or message confirmation 352 messages, respectively received and sent by the mobile processing terminal 210 (for example in the embodiment shown in FIG. 7), the use of communication carried out with proximity transmission through the optional wireless connection module 121, for example Bluetooth or NFC or QR-code or TCP/IP on Wi-Fi with module 122, is considered preferable although not obligatory, as also wireless networks for remote communications can connect near devices.

Also the request messages 351 sent directly by first processing means and confirmation message 352 sent directly to first processing means are stored on the partition of the security memory 200, which is different from the security partition, in order to show the history of these messages to the user in an intelligible way, as described above for the messages 340, 345 and 360.

Said wireless network for request message 340, said wireless network for request message 351 sent directly by first processing means, said wireless network for confirmation message 352 sent directly to first processing means and said wireless network for confirmation message 345 may be different one from another or be the same for some or all of said messages. In analogous way it is for the message 360.

In FIG. 8, the message 340 of FIG. 3a, is substituted by a request message 351 sent directly by first processing means, typically through, but not limited to, a wireless network for proximity communications, including as a limit case the possibility to input data, read on the first processing means display, on the terminal 210 to transmit these data in proximity.

In the embodiment of FIG. 9, the message 345 of FIG. 3a is substituted by a confirmation message 352 sent to first processing means. In this case, in principle, the wireless network of proximity communication may be implemented by manually inputting data, which have been read on the mobile processing terminal 210 and then written on first processing means.

A request message 340 may be followed by a confirmation message 352 sent directly to first processing means instead of a message 345, as in FIG. 9.

On the other hand, a request message 351 sent directly by first processing means may substitute the request message 340 as described in FIG. 8.

As an alternative, the messages 351 and 352 may substitute both the messages 340 and 345 respectively, as shown in FIG. 7.

In FIG. 10, the first processing means and the second processing means are formed by the same mobile processing terminal 210.

In this case, messages 351 and/or 352, if they are present, are typically internal to the mobile processing terminal 210 and are data exchanged by components or software modules present on the mobile processing terminal 210 itself.

Also in the embodiment of FIG. 10 a message 340 may be followed by a message 352 or by a message 345.

As an alternative, the message 340 may be substituted by a message 351 and be followed by a message 345.

As an alternative, both the messages 351 and 352 may be used in substitution of messages 340 and 345 respectively—

In all embodiments each of messages and data 340, 345, 351, 352 may be exchanged in the form of remote or proximity communications.

According to an embodiment of the invention, messages 340, 351 may be enabled to be received by the user with the act of moving the second processing means so that movement data are available to application means 220 for operating with the security memory 200, through an optional accelerometer present in the second processing means 210.

Said accelerometer records acceleration curves time dependent that are compared with acceleration curves obtained in a previous configuration phase.

In case of matching of said curves within a configured tolerance, application means 220 put the second processing means 210, for a predefined time, in a listening mode to receive incoming messages 340 or 351.

Alternatively, the application means 220 may read said incoming messages by calling, for a predefined time, an additional intermediate server that temporary stores messages that are sent by the applicative server 315 (in case of said data message 340) or that are sent by the first processing means 100, 303, 210 (in case of message 351). The mechanism of reading data from an intermediate server, where data are put by another device, is suitable as a further wireless network included in said wireless networks usable with the mobile processing terminal 210.

Operation requests 305 sent by means of the QES application (application means) 220 to the front-end server 310 are in the diagrams of FIGS. 5 and 6.

The requester status response message 370 can be asynchronous (for example SMS text messages) or, for example, synchronous, if using the optional wireless connection module 122. Wireless network for proximity or remote communication used by the mobile processing terminal 210 for operation requests 305 and response messages 370 may be different and of different kind (one for remote communication and other for proximity communication or vice versa) or the same.

The request operations are described in general in the following.

These request operations can be original request operations of the requester, where each original request can correspond to several operation request sent to the front-end server.

Some of these operation requests do not reach the second processing means 210 for the QES of the recipient but in any case they contribute to the execution of the operation as a whole. In general, if the responses expected from the servers are not received, this triggers a timeout period, after which the request is considered not executed.

The first example of embodiment described relates to the payment request type (for example payment via bank money transfer or debit card or credit card implemented through the network of the QES system) in the case of a user requesting the payment different from the recipient user.

At least the recipient is registered in the QES system and operates through the mobile processing terminal 210 for QES.

At least one applicative server 315 is present to manage payment type messages for the recipient's bank or for the payment gateway related to an ecommerce website or service or point of sale. The bank or the payment gateway is interfaced with the QES system, through the applicative server 315.

An original payment request results in only one operation request 305.

For the first example of embodiment, reference is made to the diagram of FIGS. 3a and 3b. In FIG. 3a, a requester different from the recipient is indicated with 300.

The requester may be the beneficiary of the transaction, or may operate on behalf of the beneficiary, to perform payment requests.

The requester 300 may, for example, be a merchant or a service company or public administration that requests a payment from a user recipient 365 of the dedicated network, who is in fact a user of the QES system.

In FIG. 3a the requester different from the recipient 300 is connected by means of a processor 303 (first processing means), for example a personal computer. The processor 303 is indicated in the figure but it could also be a conventional smartphone or tablet or handset computer 100, for example, in the case of itinerant trade. The processor 303 could also be the terminal 210 of the requester using its capabilities common with the terminal 100.

The interface server 302 is configured to consequently process an original request that the interface server 302 translates into a single operation request 305 (specifically a payment request) in automatic or interactive mode to the front-end server 310.

The interface server 302 can, for example, be a website from which to perform requests through a browser.

Communication between the interface server 302 and the processor 303 (or the conventional mobile processing terminal 100) can be implemented according to one of the methods known to those skilled in the art, provided that it allows the interface server 302 to translate the original requests of the requester 300 into operation requests 305 that can be processed by the front-end server 310 (as better specified hereinafter) and provided that the requester status messages 370 received by the same interface server 302, coming from the front-end server 310, are interpreted in information intelligible for the requesting user 300.

FIG. 3b instead refers to an embodiment, in which a requester 300, different from the recipient, is connected to the QES system by means of a respective mobile processing terminal 210 for QES.

In this case, the first processing means of the requester are represented by the mobile processing terminal 210 of the requester, which is structured as the mobile processing terminal 210 of the recipient, and which uses capabilities of general type, like those implemented in the terminal 100.

In this embodiment the mobile processing terminal 210 of the requester is configured to perform direct operation requests 305 to the front-end server 310 and interpret the requester status messages 370 received in information intelligible for the requesting user 300 by means of an application software that may coincide with the QES application 220 (application means).

Connection of the mobile processing terminal 210 of the requester for QES to the front-end server 310 can be carried out typically through, but not limited to, a wireless network for remote communications, for example sending SMS text messages on the mobile telecommunication network or sending data on a wireless network in another form.

In view of the aforesaid difference between diagram 3a and 3b, unless specified, reference will be made to diagram 3a for simplicity, without loss of generality.

The operation request 305 sent to the front-end server 310 may comprise request data comprising:

identifier of the type of payment request;
identification data of the recipient 365 of the dedicated network. Identification data of the recipient of the dedicated network is defined as follows. Definition of identification data of the recipient of the dedicated network is equivalent to definition of identification data of the user of the dedicated network. Identification data of the recipient of the dedicated network can include the optional identifier of the wireless network or the optional identifier of the type of wireless networks (each network belonging to said type addresses messages to the mobile processing terminal 210 through the same terminal identifier); said optional identifier is that to be used or preferably to be used by the mobile processing terminal 210 to receive the request message for the current operation (i.e. if only one wireless network, or type of wireless network, is possible for the recipient or a default network identifier must be considered for the recipient, the network identifier may not be present in the operation request). Identification data of the recipient of the dedicated network includes the terminal identifier of the mobile processing terminal 210 to receive messages on said wireless network or on said type of wireless networks for the current operation, or, instead of the terminal identifier, the identifier of the recipient within the QES system associated with this mobile processing terminal 210;

financial transaction data that may comprise data, such as the total amount in cash of the sum requested for the payment, the related currency, the payment method selected (for example bank transfer or credit or debit card), the related reference for the payment (for example respectively the IBAN code of the requester or his credit or debit card number), the name of the beneficiary holder, the reason for payment, place, any e-mail address of the requester and/or of the beneficiary, and/or, if the requester and/or the beneficiary is registered in the dedicated network for QES, related information for the respective identification in the QES system as the identification data of the recipient of the dedicated network described above. Other additional information on the basis of the payment method may be requested.

The front-end server 310 assigns a unique request identifier and a timestamp to the single operation request 305, verifies the correct format of the request and the presence of the user recipient 365 of the request in its own database of registered users, on the basis of the identification data, i.e. his telephone number or other terminal identifier of the mobile processing terminal 210 and the respective wireless network (or said type of wireless networks) associated or the identifier of the user in the QES system, from information present in the same operation request 305.

If this identification data is not found in the registered user database of the server 310 or the data received in the operation request 305 message is incomplete or contains errors, the front-end server 310 sends to the interface server 302 a requester status message 370 including the unique identifier of the request and the timestamp previously assigned. The requester status message 370 in this case indicates an error.

Instead, if the verification is successful, the front-end server 310 interrogates this database of users registered, searching for, for the user 365 of the dedicated network for QES, an address reference of the applicative server 315 (for example, its URL, Uniform Resource Locator, for an Internet connection) to which the front-end server 310 must route the operation request 305, on the basis of the type of request indicated therein, in this case a payment request.

Other applicative servers connected to the front-end server 310, for other types of request, represented in FIG. 3a for simplicity only by the $N^{th}$ applicative server 325, are not involved by the process.

If the address reference is missing, the front-end server 310 sends the requester status message 370 including the previously assigned unique identifier and timestamp, indicating the error that occurred.

Instead, if the address reference is present, the front-end server 310 sends a forwarded request message 308 to the receiving applicative server 315, i.e. a message including the information of the operation request 305, to which the front-end server 310 adds the unique identifier and timestamp previously assigned by the front-end server 310 to the corresponding operation request 305.

The applicative server 315 further validates the forwarded request 308 on the basis of the specific format and searches, in its own database of users registered, for the presence of a user associated with the information received as identification data, i.e. the user identifier in the QES system or the terminal identifier of the mobile processing terminal 210 on the wireless network (or said type of wireless networks), said wireless network being received in the forwarded request 308, or being the default or unique wireless network registered for said recipient in the applicative server database.

The QES certificate associated with each user, and the related certificate of the certification authority that issued it, is also available to the applicative servers.

The applicative server 315 checks the state of validity of the user (as described hereinafter) and of the certificate on the basis of latest available list of revocations and suspensions of said Certification Authority periodically downloaded by the applicative server 315 and therefore already available.

This check is then repeated, after receiving the QES, on the basis of a list of revocations and suspensions updated subsequently to time that the signature was performed, as up to the time of signature these lists might have been updated by the Certification Authority with respect to those used in the first check.

The preliminary check makes it possible to avoid messages being sent to invalid users on the basis of the available lists.

If one of these checks is negative, a status forward message 366 with negative response is sent by the applicative server 315 to the front-end server 310 in response to the previous forwarded request message 308.

The front-end server 310 then sends a corresponding negative requester status message 370, in response to the previous operation request message 305.

The requester status message 370 reaches the requester 300 through a client program on the processor 303 or mobile processing terminal 210 or 100, which processes the status received from the interface server 302.

The requester status message 370 includes the identifier of the request and the timestamp assigned by the front-end server 310 to the operation request 305 and consequently present in the request message previously forwarded 308.

Instead, in the case of positive status of the aforesaid checks, the applicative server 315 sends a request message 340 containing a text-based information to the mobile processing terminal 210 of the recipient, sending said message through the right terminal identifier (such as the telephone number related to the optional SIM 120 or the terminal identifier for push messages) and the right wireless network, according with said aforementioned identification data of the recipient of the dedicated network received in the operation request 305 and by consequence present in the forwarded request 308.

For choosing the wireless network and terminal identifier used to send the request message 340, the applicative server 315 makes as follows.

For brevity with the term wireless network, also said type of wireless networks addressing messages through a same terminal identifier for a given mobile processing terminal, is included.

If in the forwarded request 308, the recipient wireless network is not present, the default or unique wireless network and related terminal identifier from the applicative server database are considered if said terminal identifier is also present on the forwarded request 308 and by consequence said terminal identifier and said wireless network are used to send the request message 340; otherwise if in the forwarded request 308 the identifier of the recipient user is present, the terminal identifier and related wireless network are derived from said identifier of the recipient, said identifier of the recipient user being associated in the database of the applicative server 315 with a default or unique terminal identifier valid on a default or unique wireless network.

If in the forwarded request 308 the recipient wireless network is present with the terminal identifier, the request message 340 is sent through this one, if matching with applicative server database data.

If in the forwarded request 308 the recipient wireless network is present with the identifier of the user, the terminal identifier is derived from the applicative server database taking the terminal identifier associated with said identifier of the user and on the wireless network received in the forwarded request 308.

In addition, said defaults above discussed may be re-configured run time.

Optionally, if the act of sending the request message 340 with these rules fails, the applicative server 315 can try with one or more other valid terminal identifiers for said recipient on the relevant wireless networks, or the applicative server 315 can change the wireless network to send the request message 340, based on indications, about the wireless network available or preferred, received by the mobile processing terminal, said indications changing, for example, the default wireless network to use on the basis of the area where the mobile processing terminal is.

After defining said terminal identifier and said wireless network to use, the applicative server 315 sends the request message 340 to the mobile processing terminal 210; said request message 340 is stored in the user database of the server 315 for the same given recipient user 365.

The text-based request contained in the request message 340, sent to the recipient, concatenates the information of the forwarded request 308, including the identifier of the type of request related to the payment.

Concatenation is intended as the arrangement in sequence of information in text format, if necessary divided by separators or according to a shared scheme, so that the recipient can, if required, recognize and interpret the different information in the same message.

The text-based content of the request message 340 is formulated to represent a clear payment authorization in natural language, e.g. "I authorize the payment of 321.00 euro to IBAN IT96R0123454321000000012345 of Giochi and Giocattoli S.r.l, Milan, via Salici 32, time 16:43:54, request identifier 23456789"

The text-based content of the request message 340 is stored on specific persistent areas, for example a mass memory, connected to the applicative server 315.

The address reference to the file corresponding to the stored text-based content of the request message 340, together with the identifier of the request that was assigned by the front-end server 310 to the operation request 305 (and therefore present in the forwarded request 308 and in the text-based content of the request message 340), is maintained within a database of said server 315.

These data are maintained correlated with the identifier of the operation request 305 together with the timestamp of the same request and together with the recipient user 365 and with the other data of the request message 340.

The timestamp allows evaluation of whether the timeout, configured in the system to consider the requests expired, has expired.

The applicative server 315 sends a SMS or other kind of request message 340 containing a text message to the mobile processing terminal 210.

In general, the mobile processing terminal 210 for QES of the recipient 365, through the QES application means 220, parses the messages received.

The application means 220 distinguish (on the basis of the format and of an optional identifier, eventually present in the message request 340, of the QES system or of the applicative server) whether or not a generic message received, such a SMS or push message, has been sent through the protocol of the dedicated network of the QES system.

In the case in which the mobile processing terminal 210 is switched off or the QES application means 220 are deactivated, the request message 340 is received and processed when the mobile processing terminal is switched on again or when the QES application 220 is restarted.

If the timeout of the request has expired, the request message 340 is considered rejected by the applicative server 315.

If other request messages 340 are received, the processing thereof by the QES application 220 is suspended until the first request message 340 has been executed. Subsequently, the following request messages 340 are processed in order of arrival.

The QES application means 220 are configured to automatically show (when they recognize that the message received is a request message 340) on the display 110 of the mobile processing terminal 210 a graphic interface configured according to the type of request indicated in the request message 340, i.e. payment request, document subscription, or network service access.

In the case of a payment request, the application means 220 calculate the hash of the text-based request contained in the request message 340 and shows the text-based request contained in the message 340 on the interface 110 optionally with said hash.

As the hash can contain hidden characters, it is encoded with hexadecimal notation or in base64 or other format on the display 110.

The QES system is also configurable so that the request message 340 already includes this hash, pre-calculated by the applicative server 315.

In this case the application means 220 in any case calculate the hash of the text-based contained in the message 340 and compare it with the one received, visualizing the status on the display 110.

The length of the text-based request present in messages 340 is short and therefore calculation of the hash on the mobile processing terminal 210 does not cause performance problems.

The hash of the text contained in the request message 340 is optionally visualized in plain text on the mobile processing terminal 210 and the hash calculation algorithm is of standard type; said hash by consequence can also be recalculated by the user autonomously for an additional check, for example through calculation software available on the Internet.

The choice of the hash algorithm is determined by the legislation of reference in the country of use in the case of strict compliance with the QES. For example, in Italy the algorithm SHA-256 is used at the moment, without loss of generality.

On the basis of the legislation of the country of use, before the signature, the hash must, if necessary, be padded with any additional information required, such as the padding pkcs#1 version 2.1.

The hash string can be visualized on the display 110.

If the hash is also calculated by the applicative server 315, it must be present in the text-based request present in the message 340 to allow the application means 220 to implement the check.

The recipient user can decide not to confirm the request.

In this case, it is possible to operate (in particular by selecting an option from the application means 220) to process any other text-based request messages 340.

By selecting said option of the application means 220, the confirmation message 345 is not sent within the timeout configured and therefore the dedicated network for QES considers the operation request 305 rejected.

It is also possible to configure the QES system so that this rejection is explicit. In this case, an unsigned negative confirmation message 345 is sent by the mobile processing terminal 210 through the application means 220.

Said negative confirmation message 345 contains the requested identifier of the previous operation request 305 assigned by the front-end server 310 and therefore present in the dispatched request message 308.

The negative confirmation message 345 is interpreted by the applicative server 315 that responds with a recipient status message 360 confirming the receipt.

The applicative server 315 sends the content of the confirmation message 345 to the front-end server 310 through a status forward message 366 in response to the previous forwarded request 308, again containing the identifier of the corresponding operation request 305.

The front-end server 310 interprets the message and sends it to the requester as negative requester status message 370 in response to the related initial operation request 305.

Instead, if the user of the recipient dedicated network 365 wishes to confirm, by signing the request digitally, he/she uses the keypad 115 to enter the PIN code requested by the QES application means 220 and performs the QES on the aforesaid hash string.

In particular, RSA encryption is performed through the private key 201 on the hash (decoded for example from base64 or hexadecimal format, useful in this context only for visualization or transmission) activated through entering a signature PIN code requested by the application means 220.

If the signature PIN code is incorrect, the QES application 220 (due to an error received from the security memory 200) visualizes an error on the display 110.

According to a known scheme, if a permitted number of incorrect attempts, which is configured on the security memory 200 and if necessary also on the QES application means 220, is exceeded, action must be taken to unblock the security memory 200 through the PUK (Personal Unblocking Code) using the application means 220 or basic drivers of the security memory 200, if it is necessary to reset the PIN code.

Once the security memory 200 has been unblocked, the operation can be continued by entering the correct PIN code.

If, in the meantime, the predefined timeout is triggered, the operation request 305 is considered rejected.

Alternatively, also in a situation with the PIN code blocked, it is possible to explicate and manage the explicit rejection as described above, as it does not require a signature.

If the PIN code is entered correctly, the QES is implemented on the hash on the security memory 200 of the mobile processing terminal 210 (starting from the text-based request contained in the message 340) through the QES application means 220 that operate on the security memory 200.

This signature PIN code is not transmitted either on or outside the dedicated network but it is used only to activate the signature locally on the mobile processing terminal 210.

To allow verification and identification, a detached QES is sent from the mobile processing terminal 210 to the applicative server 315 through a confirmation message 345.

The confirmation message 345 contains the unique identifier of the associated operation request 305.

This detached QES, also called separate electronic signature, has no plain text message to which the hash refers, no associated signature certificate, and no certificate of the Certification Authority that issued the signature certificate. Optionally it can contain identifiers of these certificates.

The confirmation message 345 reaches the applicative server 315, which performs a first format check of the confirmation message 345 and, if this check is positive, verifies the signature contained in the confirmation message 345, on the basis of the text-based request contained in the message 340, without the control hash if present therein as text (the text-based request being thus considered the plain text document with respect to the signature).

The text-based request was previously stored on the basis of the unique identifier associated by the front-end server 310 with the operation request 305.

The signature verification is also conducted on the basis of the signature certificate associated in the database with the terminal identifiers (one or more) related on respective wireless networks (or said type of wireless networks, each addressing messages to the mobile processing terminal 210 through the same terminal identifier) of the mobile processing terminal 210 and associated with the certificate of the Certification Authority that issued the signature certificate.

In general, the applicative server 315 performs a periodic download from the servers containing the revocation and suspension lists or CRL-CSL (Certificate Revocation List-Certificate Suspension List) of the Certification Authorities that issue the signature certificates present in its respective database, registering for each download of these lists the timestamp corresponding to implementation of the download request.

If a certificate of the QES system has been revoked or suspended, or has expired, the status of the corresponding user is considered disabled by the applicative server 315 for any requests addressed to him/her with timestamp subsequent to or the same as the time at which the validity of the certificate expired. This time is indicated in the corresponding CRL-CSL.

This is also the case if a user of the dedicated network cancels the agreement for the QES system.

The information related to disabling the user, to the validity of the certificate, the timestamp starting from which the certificate is invalid, the download timestamp of the CRL-CSL list, with which validity verification was conducted, is available in the database of the applicative server 315.

Specifically, the applicative server 315 compares the download timestamp of the CRL-CSL list of the Certification Authority related to the user identified by that telephone number or other terminal identifier (one or more, each related with a wireless network) of the mobile processing terminal 210, with the timestamp with which the signature is received.

If the download request timestamp is subsequent in time to the signature receipt timestamp, the applicative server 315 considers the last CRL-CSL list to validate the certificate. Otherwise the applicative server 315 downloads said updated CRL-CSL list in advance with respect to the time established for the download and records a new timestamp corresponding to the time at which the download request was performed, which is valid to consider the status of the certificate, as the download is subsequent to the receipt of the signature.

If the certificate linked in the database to the telephone number or other identifier of the mobile processing terminal 210 (and related wireless network) has been revoked or suspended or has expired before or at the time coinciding with the timestamp corresponding to the receipt of the signature, or if the operation to verify the signature contained in the confirmation message 345 fails, then the message 345 is not validated.

For example, this can be due to a signature performed after revocation of the certificate, or if the signature is performed by a different user with respect to the designated one, using a different private key 201 from the one combined with the public key related to the certificate with which the user is registered in the applicative server 315.

If the request message 340 reached the correct mobile processing terminal 210 through its terminal identifier valid on the respective wireless network (or type of wireless networks) on the basis of the information registered in the database, and above all if the signature was implemented with the correct private key 201 related to the correct certificate registered in the database, the signature performed can be validated.

The applicative server 315 also compares the current time with the timestamp of the operation request 305 assigned by the front-end server 310 and present among the metadata related to the request message 340 available to the applicative server 315.

If the difference is greater than the timeout configured in the system for the particular type of request, the verification fails.

If verification of the confirmation message 345 at the level of the applicative server 315 fails, a recipient error status message 360 is sent to the mobile processing terminal 210 in response to the previous confirmation message 345, and subsequently an error status forward message 366 is sent to the front-end server 310 in response to the previous status forward message 308.

The front-end server 310 sends a requester error status message 370 in response to the initial operation request 305.

The requester status message 370 includes the timestamp and with the unique identifier assigned to the operation request 305 (and therefore to the messages originated for managing this request) by the front-end server 310.

The requester status message 370 is interpreted and made available to the requester different from the recipient 300 through interpretation of the interface server 302 and subsequent visualization or updating on the processor 303 or on the conventional mobile processing terminal 100.

In the case of payment requests, the applicative server 315 is typically installed at the bank of the recipient user 365.

If the signature verification and other verification operations are successful, the applicative server 315 sends a payment order request 350 to the server of the bank 330 connected to the network of the QES system proposed.

The order request 350 contains data present in the text-based request contained in the message 340 and other data that may be requested by the bank and available on the applicative server 315 or its database.

The server of the bank 330 implements, through its database within the network of the bank, an association between its clients and the users of the QES system, based on the user identifiers and/or terminal identifiers of mobile processing terminals 210 and respective wireless networks (or said types of wireless networks addressing messages to be sent to a mobile processing terminal using a same terminal identifier) with which they are registered in the QES system.

On the basis of this association, the server of the bank 330 can assign the correct current account or, for example, the correct credit/debit card corresponding to the user 365 from which to perform the payment.

If there is insufficient available cash in the corresponding account, or in the case of incongruent or incorrectly formatted data, a negative order feedback message 355 is issued in response to the order request 350, transmitted to the applicative server 315, which sends a respective recipient error status message 360 to the mobile processing terminal 210 in response to the previous confirmation message 345.

The applicative server 315 also sends a specific error status forward message 366 to the front-end server 310, in response to the previous status forward message 308.

The front-end server 310 then sends a requester error status forward message 370 to the requester, in response to the previous initial operation request message 305.

The requester status message 370 is managed in the same way as the other cases mentioned above.

In the event of validation by the server of the body of the recipient 330, it sends a positive order feedback message 355 to the applicative server 315, in response to the previous order request message 350.

The applicative server 315 in turn sends a positive recipient status message 360 to the mobile processing terminal 210 in response to the confirmation message 345 previously received, and a positive status forward message 366 to the front-end server 310, in response to the previous forwarded request message 308.

The front-end server 310 sends a positive requester status message 370 to the requester 300, in response to the initial operation request 305.

The requester status message 370 is managed in the same way as in the previous cases, sending the positive status message to the requester different from the recipient 300.

If the operation request message 305 includes e-mail address of the requester 300 and/or of the beneficiary, the front-end server 310 sends to the corresponding e-mail address/addresses the e-mail that translates the requester status message 370 into natural language, both in the case of positive status and in the case of negative status of the transaction.

In the case of positive status, if identification data of the requester or beneficiary was present in the operation request 305 in the form of said aforementioned identification data of the user of the dedicated network if belonging to the dedicated network for QES, the front-end server 310 manages a notification to this user, which is received on the mobile processing terminal 210 of the requester/beneficiary.

For each request message 340, the applicative server 315 also sends the user 365 an e-mail with the same content, if email address was provided in the registration step of the user in the dedicated network.

The front-end server 310 updates the status of the operation started with the initial operation request 305, on the basis of the status forward message 366 received, to be able to check, also subsequently, the status of the transaction, identified with the unique identifier assigned by the same front-end server 310, that connotes it as indicated above also with a timestamp.

Through the payment method configured by means of the QES system of the payment request described neither the credit card number of the user 365 belonging to the dedicated network for QES, nor other sensitive information thereof, such as the password, is sent on the network. The sensitive information of the user 365 of the dedicated network for QES is managed within the bank, to the advantage of security.

If the bank of the beneficiary set by the requester 300 different from the recipient is the same as the recipient 365, it is possible to avoid, in the operation request 305, assigning as parameter the beneficiary account reference (for example, credit card number of the beneficiary) linked to the payment method set by the requester, thereby increasing confidentiality for the beneficiary.

In fact, in this case the bank has the data of both recipient and beneficiary.

It is also possible also to assign in the operation request 305 said aforementioned identification data of the user of the dedicated network, for the requester also in relation to the beneficiary.

If the body using the applicative server 315 is an intermediation body, which has sensitive data both of the beneficiary set by the requester 300 and of the recipient 365 with the respective information (related, for example, to the respective credit cards or other payment methods) and which makes these data available as database accessible to the server 315, it is possible to avoid entering sensitive data (for example the credit card number) in the operation request 305 also in relation to the beneficiary.

If requester and recipient banks are different but both connected to the dedicated server network for QES or cooperating, they can exchange said identifiers in the QES system in order to perform the payment.

The bank can also be substituted with a payment gateway or acquirer operator to which a generic website or a shop is connected in order to perform payments. The operation is the same as the operation with the bank.

In banks or payment gateways or acquirers, the application server 315 may be connected to the payment network by identifying their users with other conventional identifiers (such as alternative identifiers of credit cards, known by the server 315 and 330, and without any validity in common ecommerce websites), related (in the server 330) to usual payment systems, and associated in the applicative server 315 with the terminal identifiers (complete of the respective wireless network information) of the mobile processing terminals 210 and/or identifiers of the users in the dedicated server network.

E-commerce websites and merchants can interact with the network for QES through a dedicated payment gateway connected to the applicative server 315.

In these cases it is possible to dispatch the credit card data, received during the user's registration phase to the QES dedicated network, to the payment gateway that will keep said data in secure way and that gives back a conventional identifier (for each user) that is stored in the applicative server instead of credit card numbers. In this manner an original request generated from an e-commerce website or by a merchant in a shop generates a request 350, using in this request 350 said conventional identifiers instead of credit card numbers and sending said request 350 to the payment gateway that will perform the payment.

In analogous way, the same solution can be put in place for banks (instead of payment gateways) where credit card or account numbers may be substituted by said conventional identifiers.

Information acquired in the registration phase may be given to more payment gateways connected to the dedicated server network and to more banks.

In this case for each user of the dedicated network more conventional identifiers can be associated, one for each payment gateway or bank.

Another possibility is that the applicative servers 315 are in the banks, and the banks of the recipients 365 provided with applicative servers 315 (through a secure and dedicated network) require the sensitive data for payment from the banks of the beneficiaries through the applicative servers 315 of these latter, so that greater confidentiality is obtained for the beneficiaries, as also in this case the operation requests 305 contain no sensitive data of said beneficiaries.

Another possibility is to provide advertising integrated with payment through the QES system proposed; in this case the requester typically is a merchant or a marketing service that will be able to reach the users registered to the QES system with operation requests of payment type (with additional information indicating that the payment request is related to advertising) with same mechanisms as a payment request described above and additional features that follow. As in the case of a normal payment request a graphic interface will appear automatically on the mobile processing terminal 210 of the recipient with indication that said payment request is of advertising type. In case of confirmation by the recipient, items bought are shipped (if needed depending on items) to recipient's address (if present in the QES system or in the payment gateway or in the bank involved by the payment operation); an alternative address for the shipment can be written (or selected) by the recipient in the confirmation phase.

Instead of a shipment or together with a shipment, additional information (e.g. a link where to download a movie) for the use of the items bought can be sent to the recipient, for example by e-mail. This can be a way to reduce barriers to the end-users to buy goods, and a way to buy in a secure and comfortable way.

In general, the applicative server 315 can send to an electronic storage server the text-based payment request contained in the request messages 340, with the signature, the signature certificate and the certificate of the Certification Authority that issued the signature certificate. Typically, at least one legally valid timestamp is associated with these signatures.

These elements can be consulted by the signatory user 365 and by the requester, if belonging to the signature system proposed. The signature verification function is also available.

Therefore, in the systems of FIGS. 3*a* and 3*b* described above, the operation request 305 is validated and processed by the front-end server 310 of the QES system, becoming a forwarded request 308 to the applicative server 315, which in turn forwards this request as a request message 340 to the user terminal, the mobile processing terminal 210, where the QES is performed on the basis of this text-based communication, sent on the mobile telecommunication network, or parts thereof.

FIG. 4 shows a diagram of a variant of the QES system, which implements a further payment procedure, in which the reference 400 indicates a recipient user of the operation request 305 of payment type that also coincides with the requester performing said operation request 305.

The embodiment shown in FIG. 4, compared to the embodiment shown in FIG. 3*a*, presents the difference indicated above.

In fact, the user 400 uses the mobile processing terminal 210 to manage the confirmation through QES, namely processing the text-based request contained in the message 340, the confirmation message 345 and the recipient status message 360.

However, in this case, it is the same recipient 400 that also performs the operation request 305, preferably through another processor, i.e. the supporting processor 303 (the first processing means), as shown in FIG. 4.

The first processing means can also be the conventional mobile processing terminal 100, which is different from the mobile processing terminal 210 used in the QES system proposed. Naturally, the same mobile processing terminal 210 that manages confirmation can also be used as first processing means (like the conventional mobile processing terminal 100) to perform the request using functions that do not use the security memory 200 and/nor the QES application 220. For example, the user 400 could use the browser of said mobile processing terminal 210 to perform operation requests 305.

The user 400 of the QES system can, for example, correspond to a user operating on an e-commerce website associated with the QES system.

The website corresponds to the interface server 302, and the user, for example, can intend to actively perform a purchase or send money through the network of the QES system through the interface server 302 in favour of a beneficiary.

The user 400 introduces, for example, in place of his credit card data his/her said aforementioned identification data of the recipient of the dedicated network.

In the same manner as described with reference to the architecture of FIG. 3*a*, the information entered, for example, through a processor 303 (for example a laptop processor connected to the e-commerce website or other interface server 302 for the payment of parking fees or fines) in any case implies confirmation via the mobile processing terminal 210 of the dedicated network.

Through the mobile processing terminal 210 the user can authorize the payment via QES just as in the case of the embodiment described with reference to FIG. 3*a*.

FIG. 5 represents a further embodiment, in which, with respect to the embodiment of FIG. 4, the user interface of the user 400, who is at the same time requester and recipient, is represented only by the mobile processing terminal 210 both to perform the request and to manage confirmation.

In this case, unlike the embodiment related to FIG. 4, the application means 220 of the mobile processing terminal 210 (which operates in this case also as first processing means of the requester) send the operation request 305 directly to the front-end server 310, without interfacing with the interface server 302.

Optionally, part of the data necessary to compose the request 305 (for example, the reference of the recipient and the price) may be previously read via wireless connection module such as 121 in the proximity network, for example via QR-code on the goods to be purchased, on advertising or on an e-commerce site.

In this architecture, the recipient status message 360 only returns notification of receipt of confirmation 345 to the QES application means 220, as the mobile processing terminal 210 for QES in any case receives the final status of the requester status request 370.

FIG. 6 represents a further embodiment of the QES system of the invention, in which the user 400, who is requester of the payment and recipient of the payment request, uses only the mobile processing terminal 210 for QES to connect directly to the front-end server 310, optionally reading the necessary data through the wireless connection module such as 121.

In this embodiment, moreover, the operation request 305 associated with a given transaction already includes the QES, which is implemented before the same request step.

Through the application 220, the mobile processing terminal 210 proposes a unique identifier of the transaction (i.e. of the operation request 305 and subsequent messages) and a timestamp, which are then subjected to validation by the front-end server 310 instead of being generated by this, as it occurs in the previous embodiments.

Preferably, this unique identifier of the transaction is a hash string calculated on the concatenation of the information to be signed, of pseudo-random information provided by the QES application means 220.

If the front-end server 310 rejects the operation request 305 with a requester status message 370, which indicates as reason, for example an incorrect operation request identifier, as it is already present in the system, or which indicates as reason, for example, an incorrect timestamp of the request, as it differs (beyond a predetermined tolerance) from the one detected—at the time of receipt of the operation request 305—by the front-end server, the QES application 220 automatically re-calculates the operation request 305, the identifier and the timestamp, which change and are used in a further operation request 305.

As the message to be subscribed is different, given the modification of the aforesaid information, the signature must also be re-implemented, requesting the signature PIN code from the user.

In case the operation request 305 is validated by the front-end server 310, the applicative server 315 receives the QES within the forwarded request 308, as the signature is received by the front-end server 310 within the operation request 305 and the front-end server 310 forwards it to the applicative server 315.

In contrast, for example, to the first example of embodiment described with reference to FIG. 3a, in this embodiment of the invention the applicative server 315 does not exchange messages with the mobile processing terminal 210, as the signature is already known to the same applicative server.

The applicative server 315 however verifies the signature as described with reference to FIG. 3a.

Then, just as in the previous embodiments, at the end of the operations, the order feedback 355 is forwarded by the server 330 that performs the payment to the applicative server 315, which sends the status forward message 366 to the front-end server 310, which in turn sends the requester status message 370 that is received on the mobile processing terminal 210 and the status of the operation is thus shown.

In this embodiment the signature is sent with also the information in plain text in the operation request message 305.

A further application of QES system of the invention relates to the subscription of documents, which are not necessarily payment authorizations but can be documents of any type, through a QES, where the requester of the signature differs from the subscriber or recipient, as in the embodiments of FIGS. 3a and 3b.

Also in this case, the difference of the embodiment of FIG. 3b with respect to the embodiment of 3a consists in that in embodiment of FIG. 3b the communication between the mobile processing terminal 210 of the requester (which operates as the first processing means of the requester) and front-end server 310 takes place without the intermediation of the interface server 302.

Given this difference, hereinafter reference will be made for simplicity to the diagram 3a, without loss of generality.

The requester different from the recipient 300 can, through these architectures, perform document subscription requests to the recipient 365.

An original request of this type is normally composed of two operation requests 305 in succession: the first operation request is sent for the upload of the document, the second operation request is sent for the actual subscription.

If the embodiment of FIG. 6 is adopted, as discussed hereunder, only one operation request 305 is sent, which relates to both upload and subscription information.

Returning to the diagram of FIG. 3a, the user of the recipient dedicated network 365 is registered in the QES system according to the invention, with an applicative server 315 that manages forwarded requests 308 coming from an original request of document subscription type.

In the case of document subscription, for example in the case of an insurance company requesting subscription of a contract by the user of the recipient in the QES system 365, the first operation request 305 for document upload is sent to the server 310, which does not reach the recipient user 365.

This upload request includes metadata for the subsequent document search and reference of the document to be uploaded and stored by the dedicated network proposed.

The front-end server 310 sends a forwarded request 308 to the applicative server 315, which stores the received information and assigns to the document uploaded a respective unique identifier of the document.

Through said unique identifier of the document, the document is stored on persistent memory together with the information of the identifier of the upload operation request 305; in response the applicative server 315 provides in the status forward message 366 the document identifier, which is sent by the front-end server 310 through the requester status 370, in response to the upload operation request 305, to the processor 303 or 100 with which the requester operated.

Subsequently, again through the first processing means (processor 303 or mobile processing terminal 100) an operation request 305 is sent by the same requester 300, or by another requester, for subscription of the document previously stored, which, just as for the payment requests described previously, requires indication of the type of operation request, specifically of document subscription type, said aforementioned identification data of the recipient 365 of the dedicated network, the unique identifier of the document and/or of the previous upload operation request 305, and the e-mail address of the requester or an identifier of the requester as said aforementioned identification data of the user in the qualified electronic signature system.

Within the database of the applicative server 315, an address reference to the corresponding document identifier is maintained, together with the identifier of the related subscription operation request, of the related timestamp and of the recipient user.

A text-based request message 340 is then sent to the mobile processing terminal 210. Such a message contains the identifier of the subscription operation request 305, the hash string of the document and the address reference (e.g. URL) of the document in the meantime published by the applicative server 315 in an area accessible by the user 365.

The text-based request message 340 includes the identifier of the type of request relating to subscription and if necessary the identifier of the document, the timestamp assigned by the front-end server 310 to the subscription operation request 305, as indicated in relation to operation of this server with reference to FIG. 3a.

The text-based information contained in the request message 340 is interpreted by the QES application means 220 and visualized on the display 110 to represent a clear document subscription request in natural language.

In the display it is possible to clearly read the address reference, for example the URL, where the document is published to be visualized and the hash string of the document, calculated by the applicative server 315 and sent to the mobile processing terminal 210, as the document could be of considerable size and calculation of hash string on the mobile processing terminal 210 could be difficult.

As the hash string can contain hidden characters, it is encoded with hexadecimal notation or in base64, or other format on the display 110.

Also in this case, it is possible to select the option of the application means 220 that allows recalculating the hash on the mobile processing terminal 210 and verifying the hash received. As an alternative, the hash could be recalculated using other software on a supporting processor, by first downloading the document at the address reference indicated in the message.

If the user 365 provided an e-mail address during the registration step, he/she can also be reached simultaneously by an e-mail message containing the same message visualized on the mobile processing terminal 210 and sent by the applicative server 315.

In this way, for example, the recipient 365 can receive the e-mail consulting the mailbox on a supporting processor and by clicking on the address reference of the document, present in the e-mail, visualize it on a larger display.

The file name present in this reference can be represented by the same hash to allow a further check available to the user.

With this operation, the recipient 365 can download the document file and recalculate the hash using other tools, for example present on the Internet.

In any case, the document can be visualized on the display 110 of the mobile processing terminal 210 through the choice of a corresponding option on the application means 220.

The hash string is calculated by the applicative server 315, as already described with respect to the embodiment of FIG. 3a.

The confirmation message 345 in fact contains the identifier of subscription operation request 305, the detached QES performed on the hash of the document and, if necessary, the unique identifier of the document.

The signature corresponds preferably to the RSA encryption through the private key of the hash, once it is decoded from the presentation format such as base64 or hexadecimal. Also in this case, on the basis of the legislation adopted in the country of use, it may or may not be obligatory to add other information to the hash before the signature.

The applicative server 315 verifies the signature contained in the confirmation message 345 retrieving the document file, the signature certificate associated with the terminal identifier (and related wireless network or said aforementioned type of wireless networks, addressing messages to send through the same terminal identifier) of the mobile processing terminal 210 in the database related to the user to whom the document subscription operation request 305 was sent; said terminal identifier was used to address the request message 340 associated with the current confirmation message 345. Typically it is unnecessary to perform an order request 350 to the server 330.

As in the embodiment previously described with reference to FIG. 3a, if the subscription operation request message 305 includes the e-mail address of the requester, the front-end server 310 sends to the corresponding e-mail address/addresses the e-mail that translates the requester status message 370 into natural language, both in the case of positive status and in the case of negative status of the transaction.

The e-mail sent contains, as attachment, the signature of the document, if necessary in attached mode, i.e. having enveloped with the signature, i.e. attached thereto, also the document, the signature certificate and the certificate of the correlated Certification Authority.

Such an e-mail also contains details of the subscription operation request 305 and the identifier of the document.

A similar e-mail can be sent to the e-mail address of the user 365.

If the subscription operation request 305 contained for the requester his/her aforementioned identification data of the user 300 of the dedicated network (if he/she is registered as a recipient user in the QES system) the front-end server 310 sends him/her a notification on the related mobile processing terminal 210 of the requester through said requester terminal identifier (eventually derived from the identifier of the requester registered in the dedicated network) and through the respective wireless network or said aforementioned type of wireless networks addressing messages to the mobile processing terminal 210 through the same terminal identifier.

In general, the further aspects of the embodiment previously described with reference to FIG. 3a apply, where the document is considered in place of the text-based request message 340.

Through this signature method, the user 365 can subscribe documents in mobility through his mobile processing terminal 210 for QES, following a request from third parties, store these subscribed documents in time and send them to the requester.

If the document is an invoice or a receipt, this process allows digital subscription thereof and therefore the production of an electronic invoice or receipt. Such a document management can be combined with the electronic payment thereof by the client registered in the QES system. If the metadata of the invoice or receipt uploaded contains the client's identifier in the QES system as said aforementioned identification data of the user of the dedicated network (because in this case the client is registered as a user to the QES system) and the information for a payment request, after management of the second operation request 305 for subscription of the invoice by the seller, a payment request can be generated automatically (by the interface server 302 in the embodiment of FIG. 3a (or in the embodiment of FIG. 3b by the application means 220 of the mobile processing terminal 210 of the requester), addressed to the client, who can perform the payment via his/her mobile processing terminal 210 as a recipient.

A further embodiment of document subscription system can operate with the architecture of FIG. 4, as described previously, where the user 400 (who is requester and recipient) operates, for example, on a document or accounting system associated with the dedicated QES system. The document or accounting system or other service is represented by a website or interface server with the dedicated network for QES, through which the user 400 can sign electronic invoices or documents also of considerable size through the mobile processing terminal 210 and can use the e-mail field of the requester with an e-mail address to which the user 400 intends to send the signed document.

A further example of document subscription can be performed by the embodiment of FIG. 5 of the invention.

In this embodiment, as described previously, the user interface is represented solely by the same mobile processing terminal 210 (of the user 400 who is requester and recipient), which is interfaced directly with the front-end server 310 without intermediation of the applicative server 302, both to perform the request and to manage document subscription.

In this embodiment, the recipient status message 360 only returns the notification of receipt of the confirmation 345 to the application means 220 of the mobile processing terminal 210, as the mobile processing terminal 210 in any case receives the final status of the requester status request 370.

A further example of document subscription can be performed by the embodiment of FIG. 6 of the invention.

In this embodiment the hash is always calculated by the application means 220 of the mobile processing terminal 210.

Therefore, such an operation is possible in the case of documents of limited size, such as SMS text messages entered on the mobile processing terminal 210, which are then signed.

In this case, the document is sent via subscription operation request message 305, simultaneously with any metadata for a subsequent search on the storage systems of the dedicated network and simultaneously with the QES of the document.

The document can be entered with the keypad 115 of the mobile processing terminal 210 or can be retrieved as a file.

The user 400 can use the e-mail field of the requester with an e-mail address to which he/she intends to send the signed document.

Alternatively, he/she can use the additional field in the request that corresponds to the identification data of the user of the dedicated network to whom the signed document is to be sent using his/her said aforementioned identification data of the recipient of the dedicated network, if he/she is also registered as a recipient user in said dedicated network.

In this case, upon receiving the positive requester status 370, the application means 220 of the mobile processing terminal 210 notifies the user 400 that the operation has taken place. Moreover, the dedicated network sends notification to the mobile processing terminal 210 of the user designated by the signatory.

The recipient of the notification can read, through the application means 220, the document from his mobile processing terminal 210, having the certification of the identity of the sender provided by the dedicated network.

A further application of QES system of the invention relates to secure and certified access to network services integrated with the dedicated network for QES, such as websites, including home banking and public administration websites.

Physical areas can be controlled by network services and thus this embodiment relates to physical accesses as well and in a similar way this embodiment relates to money withdrawal system at ATMs that are network services that control the action of giving cash. More in general this embodiment, under the concept of access, relates to network services also controlling operations and/or actions under authentication of the user; without losing generality we will refer to network services only.

Such a secure and certified access can be operated by the embodiment of FIG. 4, in which the user 400 of the dedicated network for QES is registered with the dedicated network with an applicative server 315 that enables accesses to the interface server 302.

The user 400 is connected to the dedicated network for QES to perform an access request to an interface server 302 through the first processing means, which may be a supporting processor 303 with display or a conventional mobile processing terminal 100 or the same mobile processing terminal 210, which however does not use the application means 220 and the security memory 200 for the request step).

Optionally the requester could be different from the recipient following for example FIG. 3*a* and FIG. 3*b*, the recipient having the possibility to watch the display of first processing means or to know its content.

Without loss of generality, we will refer to the embodiment of FIG. 4 in the following.

The access request is normally composed of two operation requests 305 in succession.

The interface server 302 is represented by the service or website on which the user 400 wishes to authenticate.

The access requester and the user confirming are in this case the same user 400, who operates, as requester, in the same manner as the requester 300 described with reference to the architecture of FIG. 3*a*.

The interface server 302 can therefore, for example, implement a website to which the user 400 performs requests through a browser of the processor 303 or of the mobile processing terminal 100 according to known protocols, which allow the interface server 302 to translate the requests of the user 400 into operation requests 305 and to interpret the requester status messages 370 received by the same interface server 302 in information intelligible for the user 400 in the role of requester.

According to a further aspect of the invention, the generic service/website 302 belonging to the communication system with certified signature requires information to be entered in specific fields according to the username/password scheme, where in this case however the password is an arbitrary text, here called Any Temporary Password, or ATP.

The username is referred to the user 400 and can be his unique identifier within the specific service/website 302 or his/her said aforementioned identification data of the recipient of the dedicated network referred to himself/herself as user 400.

In the case of the unique identifier of the user within the specific service/website 302, association with said aforementioned his/her identification data of the recipient of the dedicated network is present within the service/website 302.

The ATP represents a random alphanumeric code decided by the user at the time at which he/she enters it, i.e. at the time at which he/she is asked to enter a password for a given transaction, such as login or authorization of an order.

The first operation request 305 comprises indication of the access request type, said aforementioned identification data of the recipient of the dedicated network 400, the identifier of the user session on the service/website 302, the ATP and if necessary the reference (for example URL) of the service to be accessed.

The operation request 305 is sent to the front-end server 310.

The user 400 in the role of recipient substantially operates in the same way as described for the recipient 365 in the embodiment of FIG. 3a.

However, before sending the text-based request contained in the request message 340 to the user 400 as recipient on the mobile processing terminal 210, the applicative server 315 carries out further specific checks.

In fact, the applicative server 315 stores the history of the last n ATPs used by the user, where n is a configurable integer including zero.

If a request has the same ATP as one present in the history, the request fails.

Vice versa, the applicative server 315 prepares a string (hereinafter referred to as base string), which is a string of characters that forms part of the text-based request contained in the request message 340.

The base string can represent plain text information or be the hash of this plain text information, on the basis of the system's configuration.

The aforementioned plain text information is a string of characters obtained from the concatenation of information present in the forwarded request 308, including the ATP, the unique identifier of the operation request 305, if necessary together with the timestamp from the front-end server 310, if necessary the session identifier, and if necessary the reference of the service, in addition to other optional data.

Therefore, the base string coincides with this whole string or with its hash, according to the configuration.

The information on the session is known by the interface server 302 and is present in the server 315 linked to the identifier of the corresponding operation request 305.

Moreover, this link is subsequently also known to the interface server 302, through the requester status message 370 corresponding to the first operation request 305.

The requester status message 370 indicates among the data the base string in the case of positive status, and in any case the session identifier and first operation request 305 identifier, so that the interface server 302 can place them in relation, as well as receiving the information on the status of the operation request and of the base string for the session indicated.

At the level of the message 340, the information on the session could be omitted, as the confirmation implemented by the mobile processing terminal 210 comprising as information the identifier of the first operation request 305, would be associated by the applicative server 315 with a confirmation for the session linked to this operation request 305.

If the base string is in plain text, it contains in plain text at least the ATP and the identifier of the first operation request 305, and the text-based request contained in the request message 340 is composed of base string and identifier of the request type (access type request).

Otherwise, if the base string is the aforementioned hash, it is formed by the concatenation of request type, base string, ATP and identifier of the first operation request 305, if necessary the session identifier and other optional information that may be present in the plain text information on which the aforesaid hash is calculated.

After the applicative server 315 has received the ATP in the forwarded request 308, if it is not valid on the basis of the aforementioned checks, it sends to the front-end server 310 a status forward message 366 indicating that the ATP entered is invalid or, if it is valid, it sends a positive status forward message 366.

This forward message 366 contains the identifier of the operation request 305, the base string and the session.

The front-end server 310 then forwards a corresponding requester status message 370 with the same information, if necessary including all the information present in the forwarded request message 308, to the interface server 302 which for the session coinciding with that received updates the indication of invalid ATP, session and identifier of the first operation request 305 or, if positive, the value of the base string and of the identifier of operation request 305 received, associated with the session together with any optional information received.

The graphic interface present on the processor 303 or mobile processing terminal 100 is updated automatically or on request of the user 400 and the error message or, in the positive case, the base string is visualized thereon.

If the base string is in plain text, the ATP contained therein may be hidden.

If the base string is a hash, if necessary, such information is shown so that the user can calculate this hash autonomously with the other tools, on the concatenation of the information visualized on the request device, to be able to compare this hash with the one visualized, knowing the rules with which the information present on the graphic interface is concatenated to calculate the hash.

These rules can also be implemented on the graphic interface of the interface website 302 as information note. Also in this case, if the hash is present, it is preferably encoded with hexadecimal notation or in base64.

However, the operations have not been terminated by sending the requester status message 370 correlated to the previous operation request message 305.

The applicative server 315 stores the data of the first operation request 305, of the message 308 and 340.

Moreover, a further operation request message 305 is created automatically by the interface server 302, upon automatic request by the first processing means (e.g. the processor 303 or the mobile processing terminal 100) of the requester to terminate the activities.

This operation request message 305 indicates among the request type data, the identifier of the previous operation request 305 obtained from the previous requester status message 370 and the retrieved session identifier runtime, which must coincide with the previous one for the new request to be valid.

The new operation request message 305 is assigned a timestamp and a new identifier through the front-end server 310.

The front-end server 310 sends the content of the new operation request message 305, including a request identifier and timestamp, through the forwarded request message 308 to the applicative server 315 where the first request message 305 was registered, marked by its identifier, together with its data with an overall operation status of "wait" type.

The new forwarded request message 308 and its identifier are, at the level of the applicative server 315, correlated to analogous parameters of the previous request due to the identifier of the first operation request 305 present in the new operation request 305.

Moreover, the applicative server 315 performs an equality check between the session identifier contained in the first and in the second forwarded request 308.

Parallel to sending the first status forward message 366, if the applicative server 315 positively validated the ATP, in the meantime it has prepared the text-based request contained in the request message 340 that is sent to the mobile processing terminal 210, with the contents described above.

The text-based request contained in the request message 340 indicates the identifier of the corresponding operation request message 305 (i.e. the first request) and is stored in specific persistent areas, for example mass memories connected to the applicative server 315.

A reference to the corresponding file, together with the identifier of the request, of the timestamp and of the recipient user (represented by his telephone number or other terminal identifier of the mobile processing terminal related to the wireless network—or to said aforementioned type of wireless networks—used to address messages through said terminal identifier, or his unique identifier in the dedicated network) are maintained within the database of said server 315, together with other data of the text-based request contained in the message 340, including plain text information corresponding to the hash if the base string is in hash form.

The applicative server 315 sends the text-based request through the request message 340 to the mobile processing terminal 210, on the basis of its terminal identifier and related wireless network—or said aforementioned type of networks—, chosen as in the case above described for payments, here for the recipient 400.

Said terminal identifier is able to make the mobile processing terminal 210 to receive messages on the wireless network used by this terminal. Said terminal identifier is received in the first forwarded request message 308 or deduced from its own database on the basis of said aforementioned identification data of the recipient of the dedicated network 400 received in the first forwarded request message 308.

In general, the methods of sending the message 340 reflect the mechanism that has already been described with respect to the embodiment of FIG. 3a.

The request message 340 typically contains a clear access request in natural language indicating the data present in the same message, visualized on the display 110 of the mobile processing terminal 210.

If the base string is in hash form, the hash value is shown, always encoded preferably in hexadecimal notation or in base64.

The application means 220 require signing QES to the base string if this is a hash, otherwise to the hash of the whole request message 340 (or of text based information thereof) this hash being calculated by the application means 220. The application means 220 may consider the hash coinciding with the base string visualized on the display 110 after decoding from the visualization format (typically hexadecimal/base64) or, in the case of plain text base string, may calculate the hash on the plain text message 340, or part thereof, visualized on the display 110.

The signature consists preferably in the RSA encryption of the hash through a private key 201.

Before the signature, the user 400 can compare in the case of base string coinciding with the hash, the ATP and the hash shown by the application means 220 respectively with the ATP entered by him/her by means of the supporting processor 303 or mobile processing terminal 100, as well as any other optional parameters.

In the case of plain text base string, the user 400 can compare the ATP and the identifier of the operation request 305 shown by the application means 220 respectively with the ATP entered by him/her on the requesting device 303 or 100 and the identifier of the operation request 305, again shown by means of the supporting processor 303 or mobile processing terminal 100, as well as any other optional parameters.

In the case of further information being present in the text-based request contained in the request message 340 and therefore on the display 110 of the mobile processing terminal 210, this is in any case also present on the graphic interface of the requesting processor 303 or mobile processing terminal 100, thus allowing the operator to check that the information present on the request and confirmation medium is congruent.

If the data are congruent, the user can proceed with the detached QES.

With regard to the methods of calculating the hash, the features described above with reference to the embodiment FIG. 3a still apply, in particular with reference to the need to add any further information to the hash before the signature, following any additional requirements for the QES in the country of use.

The confirmation message 345 is represented here by the detached QES performed on the aforesaid hash coinciding with the base string if this is in hash form or, otherwise, on the hash calculated by the application means 220 on the message 340.

The signature is accompanied by the unique identifier of the first subscription request 305 assigned previously by the front-end server 310.

The applicative server 315 verifies the signature contained in the confirmation message 345 retrieving the corresponding plain text information registered previously: the plain text information from which the hash was calculated if it was the base string. Vice versa, the whole message 340 is retrieved.

Moreover, the signature certificate is associated in the database with the terminal identifier of the mobile processing terminal 210 and the respective wireless network (or said type of wireless networks) used by the applicative server 315 to address the request message 340 through said terminal identifier to the mobile processing terminal 210, said terminal identifier being related to the user to whom the first operation request 305 was sent; said signature certificate is also related in the database to the certificate of the Certification Authority that issued that signature certificate. Both certificates are retrieved from the database and used to verify the QES received.

If verification of the signature or of other checks fails, the applicative server 315 sends a specific recipient error status message 360 to the mobile processing terminal 210 and the specific error status forward message 366 to the front-end server 310, in response to the second forwarded request 308.

The front-end server 310 sends a requester error status 370 to the requester, in response to the second operation request message 305.

In the present example, it is not mandatory to perform an order request 350 to the server 330, but this can be put in place on the basis of the type of access. With regard to the second requester status 370, what was described above with reference to the embodiment of FIG. 3a generally applies, as the user 400 in the role of recipient corresponds to the requester and in consideration that, in the second operation request 305, the e-mail address of the requester/recipient is not normally present.

In the case of positive verifications, the requester status message 370 contains the indication for the interface server 302 to consider as authentic the user on the session initially indicated in the first and second operation request 305.

Therefore, the user 400 can visualize or access the sensitive and/or protected data as his session on the interface server 302 is authorized for this. Said data may be automatically visualized on the display of first processing means.

In substance, the user 400 performs login successfully.

If the type of access is a physical access to an area, an order request 350 by the application server 315 to the server or computer 330, can be put in place for example to control an engine opening a door, in case of successful verification.

If the type of access is to withdraw cash in an ATM, an order request 350 by the application server 315 to the server or computer or machine 330, can be put in place in case of successful verification, for example, to control a machine giving the recipient user the right amount of cash, said amount being present as a further data in the first and/or second operation request 305 and requested in the previous original request by the user 400 through the terminal 303 commonly present at the point for ATM withdrawal.

More in general, in case of successful verification of the QES by the applicative server 315, when the type of access requires an operation or an action (i.e. cash withdrawal, opening a door), this can be performed through a similar order request 350 sent by the applicative server 315 to the server or computer or machine 330 to perform said operation or action, or can be performed under the request to a machine or computer or server by first processing means or by the Front-End server 310 or interface server 302, once the successful verification executed by the application server 315 has been performed and transmitted.

Further information that can be managed by the interface server 302 consists of specification in operation requests 305 of specific information or authorization within the current session. In this way, a specific double operation request 305 can be performed, as in the aforementioned case; these operation requests 305 of access type are used to also allow access to this specific information or to confirm an order.

For example, the value of the session set by the interface server 302, in the operation request 305, can contain the identifier of the particular action to be authorized or information to be accessed.

In this case a double operation request 305 similar to the aforementioned one is managed, where the username for the request step is optionally no longer requested from the user as it is known to the interface server 302 because for example the user is already logged in.

Optionally, only an ATP is requested from the user graphic interface.

For the other aspects not described here, the system operates in the same manner as described for the embodiment of FIG. 3a.

It is also possible to use the same procedure described here without using the ATP.

The method of making secure through any temporary password can be used for access to home or mobile banking, as well as for access to any service/website.

In the case of home-mobile banking, the applicative server 315 is typically installed within the network of the bank.

Comparison between temporary passwords and the other information, which is present both on the requester side and the recipient side, is preferably implemented by the user 400.

It is naturally possible for the user 400 to use as terminal for the request and for the signature a mobile processing terminal 210 for QES, using for the request step functions that are typical of a common mobile processing terminal 100.

In this case the aforesaid comparison can be performed through specific application software or the same application for performing the request step or the application means 220.

It is also possible to perform the request using the application means 220 and, in this perspective, the request through the interface server 302 may be performed by a mobile processing terminal 210.

For said comparison performed automatically, the application means 220, if visualization takes place on two different processors, can, for example, make use of a proximity communication channel, for example of Bluetooth or of NFC type, for example by means of the optional wireless connection module 121 or 122 of the mobile processing terminal 210 and/or a similar connection module of the processors 303 or of the mobile processing terminal 100 used as first processing means.

In this case, exchanged data for automatic comparison may be similar to messages 351 and 352 described hereinafter. More in general data sent by first processing means to second processing means for said automatic comparison may be performed through a wireless network for proximity or remote communication and data sent by second processing means to first processing means for said automatic comparison may be performed through a wireless network for proximity or remote communication, which can be different from the first wireless network or the same.

Again to perform an access such as a login to a network service or authorize an order, it is also possible to adopt the embodiment of FIG. 8 and initially visualize the session identifier on the processor 303 or mobile processing terminal 100 (first processing means) through communication with the interface server and promote thereon an operation request 305 without reference to the user involved.

In this case, the mobile processing terminal 210 is used immediately in an active manner (without the use of the text-based contained in the message 340) typically by the user 400 (as a particular case of requester 300 coinciding with the recipient 365), who may enter the session identifier on the application means 220 (the data entering may be considered as a particular case of proximity communication and the entered data may be considered as a particular case of message 351) and perform the attached signature thereon.

The mobile processing terminal 210 of the user 400 then sends the signature with a confirmation message 345 to the applicative server 315.

If necessary, the message includes said aforementioned identification data of the user 400 of the dedicated network (in this case the dedicated network identifier, if provided, is not really used to send a request message to the mobile processing terminal 210 because data are inputted on it, but it is used to refer the right user together with the terminal identifier) or serial number of the certificate with related identifier of the certificate of the Certification Authority that issued it, or upon receiving the confirmation message 345, the identity of the user 400 is deduced for example from the telephone number, if this is an SMS text message or by the verification of the signature, matching the signature with the contents of the requests waiting for confirmation.

In any case, the applicative server 315, after having verified the signature using the certificates present in its own database associated with the user, sends the identifier of the signatory of the dedicated network or the terminal identifier of his/her mobile processing terminal 210 (with information about the related wireless network or about said aforementioned type of wireless networks) with the session through a status forward message 366 to the interface server 302.

The interface server 302 with requester status message 370 receives said information and completes the login or the order requested on the first processing means 303 or 100.

It is also possible to add the username or said aforementioned identification data of the recipient of the dedicated in the initial step on the first processing means 303 or 100.

In this case, the information on the user for the session indicated is present in the operation request 305 until it reaches the applicative server 315.

With the restriction that it is not possible for a given user to activate more than one login simultaneously, the message 345 may not contain the plain text information on the session, as it is already present associated with the user on the server 315, and it contains the detached signature and, if necessary, said terminal identifier (with information about said related wireless network or type of wireless networks) or the identifier of the user in the dedicated network or the aforesaid information on the certificates, or once again the terminal identifier can be deduced by the applicative server 315 such as the user telephone number (as a terminal identifier of a wireless network based on the mobile network operator) by the applicative server 315, if the message 345 is an SMS text message.

In this use of the dedicated network for access (including the aforementioned different types of access such as withdrawals at ATMs) it is also possible to add the ATP on the first processing means 303 or 100 at the start of the procedure, triggering recalculation of the session identifier that appears on the related display.

If necessary, the ATP information reaches the applicative server 315 to which the user sends a first message 345 with indication of the session visualized on the first processing means 303 or 100 and receives the ATP in response with a recipient status message 360:

if the two ATPs are the same, it promotes a further signature message 345 as indicated above. It must be noted that the procedure with any temporary password described above can, if necessary, also be used in QES systems that make use of a private key 201, which however is not stored in a security memory 200.

Moreover, the signature procedure through the use of an ATP described with reference to the systems according to the present invention, can also be used with different systems, configuring an electronic signature or QES procedure according to which after visualization of a session identifier on the first processing means, the requester and recipient user 400 enters this identifier on the application means 220 of the second processing means 210.

The requester and recipient user 400 signs a QES through the application means 220, sending the QES by means of a confirmation message 345, so that the applicative server 315 can identify the signatory user through verification of the signature.

The applicative server 315 can supply this information by means of status forward message 366 to the interface server 302, which communicates with the first processing means 303 (or 100 or 210) to allow the user, if registered on the interface server 315, to perform an access to a further page on the first processing means (or other type of aforementioned access).

The user can also be able to receive on the second processing means 210 (before performing the QES) the ATP, if previously entered on the first processing means 303 (or 100 or 210).

A further application of the QES system of the invention relates to payments and subscriptions implemented according to one of the embodiments in FIGS. 3a, 3b, 4 and accesses according to the embodiment in FIG. 4, as illustrated with reference to the embodiment of FIG. 7.

The recipient status message 360 is depicted with a dashed line as it could be absent and substituted by another message, as indicated hereinafter.

In this embodiment, the text-based request contained in the request message 340 can be substituted by a message sent by the client processor 303, as depicted in FIG. 7 (which can alternatively be substituted by a mobile processing terminal 100 or 210), and directed to the mobile processing terminal 210 of the subscriber.

The requester 300 in FIG. 7 can be substituted by the requester coinciding with the recipient 400. The recipient 365 in FIG. 7 can also be substituted by the requester coinciding with the recipient 400.

When first processing means 303, 100, 210 coincide with second processing means 210, the embodiment of FIG. 7 collapses in the embodiment of FIG. 6, in which messages 351 and 352 are typically exchanged internally to the mobile processing terminal 210, so that the embodiment of FIG. 6 can be considered as a limit case of the embodiment of FIG. 7.

The interface server 302 is depicted with a dashed line as it may not be present if the request is performed from the mobile processing terminal 210.

In this context, each of the payment operation request 305 and subscription operation request 305, subsequent to upload and the first of the two operation request 305 of access type, is now substituted by two new operation request 305 in succession.

The two new operation request messages 305, each with its own identifier, are in general linked so that the identifier of the first operation request is indicated among the data in the second operation request.

In the case of accesses, a further operation request 305 follows, as in the embodiment previously described.

The first new type of operation request 305 through the messages and the servers described in the previous embodiments, besides being processed as in the previous cases, can contain indication of the requesting device 303 or 100 or 210 (first processing means) through an identifier, if possible unique.

The operation request 305, after reaching the applicative server 315, allows the applicative server 315 to send the same information that would have been contained in the text-based request contained in the request message 340, with indication of the mobile processing terminal 210 identifier (and related wireless network) of the recipient and, if necessary, of the identifier of the requester device, through the status forward message 366, which reaches the first processing means through the requester status message 370.

In this case, the applicative server 315 in any case waits for the message containing the signature, associated with the first operation request.

The requester status message 370 updates the wait status of the signature of the subscriber on the device 303 or 100 or 210 (first processing means) that performed the request.

If the request performed is of the access type, the data for updating the graphic interface of the first processing means are deduced from the requester status message 370, as described previously.

In general, the message 370 contains the information directed to the mobile processing terminal 210 of the recipient and therefore it or part of it (being transferred through the requesting device 303 or 100 or 210) can be visualized on the related graphic interface of the request device when the message 370 is received.

For example, the hash to be subscribed can be presented on this graphic interface also for payments or subscriptions, to allow a further check by the user.

The first processing means (processor 303 or the mobile processing terminal 100 or 210) also sends the information received to the mobile processing terminal 210 of the recipient so that he/she can perform his signature.

The transmission between the first processing means (processor 303 or mobile processing terminal 100) and the mobile processing terminal 210 typically takes place through alternative technologies to the SMS text message and typically by the wireless module 121 trough wireless network for proximity communications (for example Bluetooth or NFC or Wi-Fi or QR-code) or by the wireless module 122 used with a Wi-fi spot for proximity communications (such as data exchanged on a Local Area Network) or remote communications (such as Internet data), or by the wireless module 125 for telecommunication network for remote communications.

In the presence of the identifier of the request device in the operation request 305, this indication is also present among the data of the request message 351 directly sent to second processing means and therefore can also be checked by the application 220 of the recipient's mobile processing terminal 210, on the basis of the sender detected for the request message 351.

To be identified by the requesting device 303, 100 or 210, the recipient's mobile processing terminal 210 can be identified through a terminal identifier and related wireless network—or said aforementioned type of wireless networks—addressing messages to said mobile processing terminal 210 through said terminal identifier; said terminal identifier and said related wireless network (or type of) are present in the database of the applicative server 315 and deduced by it on the basis of said aforementioned identification data of the user of the dedicated network present in the operation request as in the other embodiments discussed; said terminal identifier and related wireless network (or type of) are by consequence contained in the status forward message 366 and therefore in the requester status message 370, the content of which therefore becomes available to the requester device.

A request message 351 is directly sent by first processing means to the mobile processing terminal 210 by the requesting first processing means (processor 303 or mobile processing terminal 100 or 210). Likewise, the first processing means (processor 303 or mobile processing terminal 100 or 210) must be enabled for this receipt/transmission.

The signature through the mobile processing terminal 210 takes place as already described in the previous cases and the confirmation message 345 can be substituted by a similar confirmation message 352 sent directly to the first processing means (processor 303 or mobile processing terminal 100 or 210) that sent the request message 351, typically through wireless network via the wireless connection module 121 or 122 for proximity communication but also through a wireless network for remote communications via the wireless connection module 122 or 125.

In this context, the first processing means (processor 303 or the mobile processing terminal 100 or 210) send the content of the confirmation message 352 received, through a second operation request 305, adapted to send the signature to the applicative server 315 in substitution of the confirmation message 345.

The second operation request 305 contains, among data, the identifier of the first operation request 305 described above.

The second operation request 305 involves an analogous status forward message 308, received by the applicative server 315.

Due to the presence, among the other data of said message, of the identifier of the first operation request, the applicative server 315 associates the second operation request with the first operation request, which is waiting for confirmation and whose data were registered.

Then, the process continues as in the embodiments described above.

The recipient status message 360 can be sent by the applicative server 315 or be substituted by an analogous message sent through the optional wireless connection module 121 or 122 or 125 (where at least one of them is mandatory on the mobile processing terminal 210) by the first processing means (processor 303 or mobile processing terminal 100 or 210), upon receiving the requester status message 370 related to the second operation request 305.

In the case of synchronous transmission, the mobile processing terminal 210 sends the message confirming receipt to the requesting first processing means (processor 303 or mobile processing terminal 100 or 210).

It is possible to add the ATP also for payments and subscriptions and this can be entered on the first processing means (processor 303 or mobile processing terminal 100 or 210) together with other data of the request and compared by the user with that indicated through the request message 351 (sent directly by first processing means) on the mobile processing terminal 210.

Moreover, the mobile processing terminal 100 or 210, from which the request is performed, can coincide physically with the mobile processing terminal 210 of the recipient.

In this case, the mobile processing terminal 210 does not directly use, for the request step, the functions made available by the security memory 200 and by the application means 220 and it interrogates the application means 220 by means of another application.

In this context, the messages 351 and 352 are typically internal to the mobile processing terminal 210 and can be represented, for example, by TCP/IP transmission, where the requesting application sends messages 351 to the application means 220, which responds with the messages 352.

In a further variant of the embodiment described above, with respect to this latter, it is possible to calculate the data obtained from the first operation request 305 through the requester status response 370 in an alternative way.

In this alternative case, the first operation request 305 of the two is not performed and data to send in the only (one from two) operation request 305 are calculated by means of the first processing means of the requester (processor 303 or mobile processing terminal 100 or 210), namely through the application means 220 if the first processing means are implemented by the mobile processing terminal 210 or through a different application if the first processing means are implemented by a processor 303 or a mobile processing terminal 100.

In said alternative way, in case of access request, the information related to the session identifier, if necessary combined with the identifier of an action to be authorized, is present on the graphic interface of the requesting first processing means.

This information is available to the same device and is included in the plain text information coinciding with the base string or from which the hash to set equal to the base string is calculated.

Typically, the optional wireless connection module 121 or 122 for proximity communication (but also wireless module 125 and wireless module 122 for remote communication) may be used.

In this context for all types of requests, the identifier of the operation request 305 and the timestamp are defined by the application that sends the request and must then be validated by the front-end server 310, as described previously in the other embodiments.

In the case of access request, the identifier of the operation request 305 calculated is visualized on the graphic interface of the first processing means of the requester.

The first processing means (processor 303 or mobile processing terminal 100 or 210) before sending the operation request 305 require the signature on the mobile processing terminal 210 of the recipient through the request message 351, indicating in the case of accesses typically also the session identifier.

In general, not only for accesses, the mobile processing terminal 210 of the recipient sends in response a confirmation message 352 containing the QES, as described previously.

The first processing means (processor 303 or mobile processing terminal 100 or 210) then send an operation request 305 including the received QES.

The process continues as previously described, considering that the signature is already available to the applicative server 315 when the status forward message 308 reaches it, without the need to obtain it through other messages.

The embodiment of FIG. 8 differs from the embodiment of FIG. 3a in that the request message 340 is substituted by a request message 351 directly sent by first processing means, typically through, but not limited to, a wireless network for proximity communications, including (as a limit case of implementation of said proximity network) the possibility to input data, after reading them from the display of the first processing means, on the terminal 210 to transmit these data via wireless network for proximity communication.

In the embodiment of FIG. 9, the first processing means (processor 303 or mobile processing terminal 100 or 210) provide a first operation request 305 that reaches the applicative server 315 through a first forwarded request 308, as in the embodiment of FIG. 3a.

Also in this embodiment, a request message 340 is sent to the mobile processing terminal 210. The request message 340 comprises the identifier of the operation request 305.

The confirmation message 345 of FIG. 3a is substituted by a confirmation message 352 sent to first processing means, said message including the identifier of the previous message 305 and of the signature of the recipient 365 or 400.

The confirmation message 352 is sent to first processing means that send the information contained in the confirmation message 352 (trough or not trough the server 302) via another operation request 305, which comprises its additional identifier.

The second operation request 305 is turned into forwarded request 308 when sent by front-end server 310 to the applicative server 315 where the signature received through the second operation request 305 (and by consequence through the second forwarded request 308) is checked with the text-based content of the request message 340 sent as a result of the first operation request 305.

The applicative server 315 in fact archives that request message 340 or its text parts comprising the identifier of the first operation request 305, said identifier being contained in the second message 308 available for the applicative server 315.

Depending on the result of the verification of the signature, feedback messages to first and/or second means are sent as in the above described embodiments.

Obviously server 315 can be connected to server 330 in order to authenticate the signer to services performed by server 330. Data (352) transmitted from second processing means (210) to first processing means (303; 100; 210) may be inputted on said first means by reading from the display of said second processing means, as a limit case of wireless network for proximity communications.

In FIG. 10 it is shown an embodiment where the first and second processing means are formed by the same mobile processing terminal 210 and the possible request message 351 and/or the possible confirmation message 352 of the embodiment shown in FIG. 7 are typically exchanged internally to the mobile processing terminal 210 as data exchanged between components or software modules resident in the mobile processing terminal 210 itself.

In the embodiment of FIG. 10, a request message 340 sent by the applicative server 315 may be followed by a confirmation message 352 sent to first processing means instead of a confirmation message 345 sent to the applicative server 315, as in the embodiment of FIG. 9, or may be followed by a confirmation message 345 sent to the applicative server 315.

As an alternative, a request message 351 may be sent by first processing means instead of a request message 340 sent by the applicative server 315 and it may be followed by a confirmation message 345 sent by the applicative server 315, as in the embodiment of FIG. 8.

As an alternative, both message 351 and 352 are sent instead of messages 340 and 345 respectively as in the embodiment of FIG. 7.

The embodiment of FIG. 10 can even collapse into the embodiment of FIG. 6, in which messages 351 and 352 are present in an equivalent form as their related information and functionalities may be managed in equivalent manner without formal messages.

In any case, it is noticed that in the QES system of the invention request messages 340 and/or 351 must be received (in explicit or equivalent form) by the mobile processing terminal 210 and confirmation messages 345 and/or 352 must be sent (in explicit or equivalent form) by the mobile processing terminal 210.

Any message 340, 345, 351 or 352 may be implemented as proximity or remote communication, according to the needs.

The embodiments shown in FIGS. 3a, 3b, 4, 5, 6, 7, 8, 9, and 10 may be used for implementing procedures for payments (including advertising integrated with payments and shipment), document signatures, accesses (including order confirmations, money withdrawals at ATMs, log in, physical area access, and authentication to operations or actions also integrated with machines or engines).

In a further application of the QES system of the invention, it is possible to create the private key 201 on the security memory 200 and the certificate, before the subscription step of a contract by a client with a dealer, to subscribe the contract already with QES and prevent the dealer and the organization for whom the dealer works from having to manage the paper copy of the contract and of the subsequent documents exchanged with the client.

These ones can be dealers that operate as registration operators for a Certification Authority, i.e. on behalf of a telephone operator to issue SIM cards or dealers that operate to open a bank account on behalf of a bank; in any case, the client can be the digital subscriber with QES of the contract and any other documents.

In particular, the customer can fulfil a form via the Internet for requiring the certificate and he/she can also provide his/her phone number or one or more terminal identifiers of his/her conventional mobile processing terminal, each terminal identifier being related to a wireless network—or to a said aforementioned type of wireless networks—addressing messages to said mobile processing terminal through said terminal identifier; to be helped to find such identifiers and related wireless networks (or said type of) the customer can download an application on the mobile processing terminal that finds said data; said application can also be application means 220. Other information requested for the registration is the wireless network to be considered as default (for requests where the wireless network is not explicit), the identifier of the user unique in the dedicated network (this identifier is optional), the email address of the user, general information of the identity document, references to any banks connected with the dedicated network for QES, at which the customer has a bank account, and a dealer point chosen typically from a list of dealer points where dealers for a de visu recognition are present. As a result a reservation at a dealer point is booked.

Meanwhile, a security memory or a dongle or other secure device is sent to said dealer or to the applicant address (if provided among identity document data in the registration form). The dealer can recognize the customer de visu; the customer in fact presents identity documents and the dealer validates the data previously provided by the customer to the system, said data being readable by the dealer.

The dealer can check the phone number of the customer or one or more terminal identifiers (and related wireless networks) of the mobile processing terminal present in the system, such as sending through the application an SMS message or other type of message to the customer and verifying the actual receipt by the relevant mobile processing terminal.

In the case of QES, the dealer prints paper copies of the certificate request automatically generated by the QES system with the data entered by the customer. The dealer and the customer can sign the document on paper, in the case of positive checks.

The dealer can add for registration to the system for said customer an identifier present externally on an envelope received by the Certification Authority; the envelope contains an access code to be read by the end user only.

The dealer can receive a subscription message request similar as the electronic document signature discussed in the previous embodiment through his/her mobile processing terminal 210.

This signature is a proof of a valid de visu recognition and valid data in the QES system for said customer.

The customer can make the certificate request according to the standard PKCS#10 (or similar) by inserting his nationality, fiscal code or identification of the identity and access code read inside the envelope obtained by the dealer; the user to perform the certificate request uses the application means 220, placing the security memory such as the memory dongle or microSD certified, received by the dealer or by himself/herself at his address. On this device, the customer will create the private key safely through the application means 220.

The customer may pay the dealer for the hardware received and/or recognition made.

The data provided by the customer will also be used to register the user to the dedicated network connected with the application means 220.

If the customer wishes to operate through one or more banks defined in registration, he/she will agree with them about the default mode of payment (bank money transfer, credit card, etc.), already the bank knowing all the necessary data.

Alternatively, he/she can provide such as the number and details of the credit card during the registration at the dealer and the dealer may check them if required by the procedure. Alternatively, the customer can send these details through the application means 220, once he/she gets the signing certificate.

In the embodiments described above, a single applicative server 315 has been considered for a given type of request and user belonging to the system according to the invention.

However, it would be possible to have a plurality of applicative servers for type of request and user belonging to the system according to the invention.

The system according to the invention normally provides only one front-end server 310, although the front-end servers dispatching requests could be more than one.

For example, it would be possible to have a service of the front-end server 310 and the recipient user of the requests is registered there.

The interface server 302 to which the requester 300 or the requester coinciding with the recipient 400 is connected, is connected to this front-end server 310.

The recipient user 365 or the recipient coinciding with the requester 400 who receives the requests is registered on the front-end server 310 with the addresses of the applicative servers with which the recipient user is registered for each type of request.

Following an original request coming from the requester (different or the same as the recipient), the interface server 302 can connect with the front-end server 310 specifying the applicative server 315 of the recipient user to be considered for the transaction, if this information is known to the same interface server 302 or to the requester that added this information to the request.

For example, if the interface server is a home banking website, it knows the address/reference of the applicative server on which the bank is based to manage, for example, access requests to the same home banking service.

If this information is not known to the requester 300 or to the interface server 302, there are two possibilities. As a first possibility, it is possible for the requester 300 or the interface server 302 to send a request for one particular operation request 305 of info-list type through the interface server 302 to receive the list of enabled applicative servers, obtaining this information by means of the requester status message 370.

Management of these messages only involves the front-end server 310 and is not propagated to the other network nodes.

With a subsequent request, the requester and the interface server can set the applicative server in the same request to be sent to the recipient.

As a second possibility, the requesting user and the interface server 302 send the request to the front-end server 310 without specifying this information.

If the recipient user is registered on the front-end server for a plurality of applicative servers for the type of request, the applicative server 315 indicated, on the front-end server 310, as the default applicative server related to the type of request considered and to the user considered is considered by the front-end server.

The user, with registration procedure to the dedicated network can indicate, for each type of request, which is the default applicative server.

If there is only one applicative server for the particular type, said applicative server is considered as default one.

In the case of requests performed by the application means 220 (with the requester coinciding with the recipient, as illustrated, for example, in FIGS. 5 and 6) it is also possible to save the list of the applicative servers locally on the multi-functional application 220 according to the type, to be able to specify the applicative server in the request.

A similar list for terminal identifiers and said related wireless networks (or type of wireless networks) addressing messages to the mobile processing terminal 210 of the user, can be stored locally on said mobile processing terminal with the identifier (if assigned) of the user in the dedicated network.

Said lists may be accessed by application means 220 and may be encrypted and stored, optionally inside the secure memory.

In the case of payments implemented by the requester different from the recipient, typically the requester 300 does not know the banking institution of the recipient 365 nor the related reference of the applicative server/s 315.

In this case, in fact, the requester 300 can simply know the telephone number or other terminal identifier or the user identifier (and related wireless network or said type of wireless network addressing messages to the mobile processing terminal, to be used for the current operation) within the system according to the invention.

The requester can also ask the signer which applicative server 315 to use for the operation request 305 or in alternative perform a payment original request which does not contain indication of the applicative server of the recipient.

The recipient 365 is therefore reached by a text-based request in the request message related to the default application service 315, i.e. typically from the application service of one of the banks of which he/she is a client. Optionally the front-end 310 can send a further information request to the mobile processing terminal of the user in order to have back the detail of the right application server to use, under choice of the user.

In the case of payments implemented by a user 400 that is requester and recipient (as described, for example, with reference to FIGS. 4, 5, 6 and 7), he/she can easily specify the applicative server 315 to be considered in the request.

In this way, he/she can implement the payment, by requesting that the operation takes place through a specific credit/debit card and/or bank or payment gateway, among any different credit/debit cards and/or banks or payment gateways with which he/she registered in the dedicated network, being able to specify the applicative server 315 in the operation request 305.

Otherwise, the operation will take place through the default applicative server 315.

In the embodiments concerning the document subscription, if the operation request 305 to be digitally signed for document subscription is performed by a requester 300 through an interface server 302 that also offers the service of the applicative server 315, the reference of the applicative server 315 can easily be specified in the subscription request by the interface server 302.

For example, this can be the case of an original request performed by a company to a manager thereof, as recipient 365, invited to subscribe a formal authorization and that at the same time is registered under the applicative server 315 of the company.

If it is the recipient user who also performs the request, it is probable that he/she knows the reference of the applicative server 315 or this reference can be added by the interface server 302.

Naturally, also in this case in the absence of information on the applicative server the default one is used.

In the examples of embodiment relating to access to network services, the user 400 who is requester and recipient at the same time, likewise probably knows the reference of the applicative server 315 to be entered in the operation request 305.

More simply, the interface server 302 that is specific to a certain service, after receiving the generic request by the user 400, adds the data relating to the applicative server 315 in the operation request 305 to the front-end server.

In the case of accesses to the network services, it is possible to remove the default concept, in the case in which the applicative servers registered for the user are more than one in the front-end server.

The SMS text messages, when used, can be sent through the Internet in an independent manner from telephone carriers using services available on the Internet or can be sent through their networks. A SIM card, corresponding to the telephone number of the user, is in this case typically required to receive the request messages on the mobile processing terminal.

The use of SMS text messages allows a confirmation request to be received on the mobile processing terminal 210 without the user having to remain on hold incurring possible data traffic charges.

In place of SMS text messages, e-mail messages or push messages or other kind of messages can be used through the optional wireless connection module 122 or 125, if the user has agreed to the system with this option, particularly useful in the case of use of mobile processing terminals provided with push message or push email mechanism, such as Blackberry and Android devices.

All the messages can by encrypted, in particular messages addressed to the terminal 210 of the system can be encrypted with the public key of the certificate of the user linked to one or more terminal identifiers of the mobile processing terminal 210.

In fact, the certificate is known to the applicative server and upon receiving the message on the mobile processing terminal it is possible, to decrypt the same message, to use the PIN code to activate the private key 201 and implement decryption.

The private key 201 for decryption, the related public key and certificate can potentially be different than those of the signature. In this case, the additional certificate is registered in the database of the applicative server.

For increased security, all the messages, especially those received by the mobile processing terminal 210 and sent to this by the applicative server 315, can also be signed with QES implemented by the applicative server 315 for example through a massive and remote signature device of HSM (Hardware Security Module) type, certified according to the requirements of the national and international provisions for QES.

In this case, the signature PIN code on the HSM is entered by a manager of the applicative server 315 connected with said HSM, which promotes a massive signature process of the outgoing request messages 340 and/or other kind of messages sent by the applicative server 315, and the multi-functional application 220 is provided with the digital certificate corresponding to the signature private key present on the HSM, and to the certificate of the Certification Authority that issued it.

Through this certificate, the multi-functional application 220 can verify the signature received and validate it as sent by the applicative server considered associated in the multi-functional application with the service used.

Also the request messages 351 directly sent by first processing means to second processing means and confirmation messages 352 directly sent to first processing means by second processing means can be signed and/or encrypted, as all messages between the other server nodes and client nodes of the dedicated network can.

In general, the content of the messages can be signed or encrypted, or first signed and then encrypted.

Normally, the signature certificate and the signature private key 201 for a given user are unique in the dedicated network.

The same signature certificate is copied onto the applicative servers used by the user, but in this context of QES, as the certificate is public by definition and does not contain the private key, this does not imply a security problem.

It is also possible to define pairs of certificates and separate signature private keys, on the basis of the applicative server.

In this case a plurality of private keys is present on the mobile processing terminal, to be selected at the time of entering the signature PIN code.

After the signature operation has been implemented, the message sent by the mobile processing terminal can also contain the Serial Number of the signature certificate and identifier of the related Certification Authority, extracted from the application means 220 by the security memory or other memory to allow a further control of the certificate by the server.

The security memory can, if necessary, be housed in another reader connected to the mobile processing terminal, with respect to the one often incorporated with the same mobile processing terminal.

The reader can, for example, be placed within a case that also contains the mobile processing terminal or connected through an available input/output interface, such as the headphone and microphone port.

It is also possible to consider the use, within the dedicated network, of different private key repositories with respect to the security memory, which are, for example, embedded in the mobile processing terminal or connected thereto or which coincide with the SIM.

Depending on the configuration of multifunctional application means 220, it can search for the most secure and available repository built-in, embedded or connected with the mobile processing terminal, in terms of warranty of non-extraction of the data of the private key and in terms of the execution of the RSA algorithm (or other given algorithm), in the absence of the security memory.

In contexts in which the use of the QES or of the equivalent QES is not required, it is possible to use non-certified private key repositories, hash algorithms different from those required for the QES and preliminary de visu recognition of the user can be avoided.

The solution described above has various advantages with respect to the prior art.

The signature system and signature procedure according to the invention advantageously allow, through the use of the security memory, in connection with a mobile processing terminal and a dedicated network for QES (including the servers 310, 315 and optionally 302), protection of the private key 201 against the copy, the extraction and the use of this private key for the QES.

The user can therefore subscribe documents, order payments and access information services, in security and in mobility.

The sensitive information is also protected at the level of applicative servers 315 of the dedicated network or server 330 integrated with applicative server 315, as these servers are protected.

The information used within the dedicated network at the level of front-end server 310 and the interface server 302 is instead not sensitive.

By preferably adopting the RSA signature algorithm of asymmetric type and with the requirements for the QES, a high degree of security is achieved, such as to make this electronic signature legally equivalent to the handwritten signature in many national legal systems.

The security memory 200 is advantageously installed on a removable medium and does not require agreements with telephone operators for its use, nor is it necessarily linked to the credit card circuits.

The user can pay with his bank belonging to the dedicated network and continue using his mobile operator without changing it as the QES and the private key are provided through the security memory 200, which is independent from the mobile operator and typically different from the SIM.

The removable medium can be housed in the mobile processing terminal 210, which is configured to receive messages at least on a wireless network for remote communications such as Internet data via Wi-Fi spot or via SMS (Short Message Service) through a dedicated telecommunications network (as a form of wireless network for remote communications), or on a wireless network for proximity communication, to receive request messages; said mobile processing terminal 210 is configured to send confirmation messages through a wireless network for remote or proximity communications, different from the wireless network used by the mobile processing terminal to receive or the same; a confirmation message in response to a request message typically includes the signature of the user on the basis of the request message and on the basis of a given architecture of server components within which the users of the system are registered.

The architecture of the dedicated network for QES, if necessary, allows the use of other storage devices to contain the private key.

Advantageously, the QES system makes use (in the majority of the described embodiments) of a QES in detached form, which is not included in the same message with the plain text information and therefore neither the corresponding plain text information nor the sensitive data can be extracted by a hacker.

Exceptions to this are the embodiments, for example, according to the architecture of FIG. 6 where the operation request is signed at the origin before being sent.

In general, no re-usable passwords, PIN codes are transferred on the network of the signature system proposed. Credit card numbers or bank account information may be transferred just during the registration phase; it is also possible not to transfer these data during the registration phase under agreement with banks and/or bodies involved.

The signature itself cannot be copied and used again for different requests.

In this case, the QES used varies each time as also the associated plain text information changes each time.

The associated plain text information is present on the applicative servers 315, which verify the signature received and thus authenticate the signatory user and verify whether signature relates to specific plain text information.

Naturally, without prejudice to the principle of the invention, the details of construction and the embodiments can vary widely with respect to those described and illustrated purely by way of example, without however departing from the scope of the present invention.

It is possible, in addition to the security memory 200, to consider the use, within the dedicated network, or other storage media, or private key repositories with respect to the security memory, which are, for example, embedded in the mobile processing terminal, or which are connected thereto, or which coincide with the SIM.

Among embedded repositories, a Trusted Execution Environment (TEE) is included. As mentioned above, a TEE is a secure area in the main processor of the mobile processing terminal 210 that ensures sensitive data are stored, processed and protected in a trusted environment.

Among private keys repositories connected to the mobile processing terminal 210, a dongle to plug into the audio/microphone socket may be included, as mentioned above.

Private key repositories may or not may be certified for qualified signature.

In contexts in which the use of the QES or of the equivalent QES is not required, it is possible to use, for example, these non-certified private key repositories for the QES, different hash algorithms and encryptions from those necessary for the QES, if necessary avoiding preliminary de visu recognition of the user.

The invention claimed is:

1. A qualified electronic signature system configured to exchange data between a requester device and a signer mobile device for a signer to sign with signer's qualified electronic signature of mobile type, comprising:
   said signer mobile device comprising:
      a display;
      a security memory, distinct from a Subscriber Identity Module (SIM) for mobile telecommunication networks, and comprising at least a secure partition in which at least a private key of the signer is stored;
      a mobile processing terminal configured to:
         receive a request message via proximity or remote communications;
         activating the security memory in response to an activation code input on the signer's mobile device, to allow the signer to sign with the private key of the signer with a qualified electronic signature;
         send a confirmation message via proximity or remote communications;
      a dedicated server network, distinct from servers of mobile telecommunication networks, that performs a communication between the requester device and the signer mobile device, said dedicated server network comprising:
         a front-end server configured to receive, validate an operation request from the requester device requiring the qualified electronic signature or containing the qualified electronic signature, and then forward the operation request via a forwarded request;
         one or more application servers configured to receive and validate the forwarded requests, and to send the forwarded requests as message requests to the signer mobile device when data to be confirmed by the signer is sent by the application server;
      wherein the signer mobile device is also configured to:
         apply the private key and sign with the qualified electronic signature by encryption of a hash of the request message received from the application server, or received directly from the requester device, and/or by encryption of parts thereof;
         automatically show on the display a text-based request present in the request message received;
         send, after signing with the qualified electronic signature, a confirmation message containing the qualified electronic signature in detached form directly to the application server or indirectly through at least the requester device, to allow in the application server an identification of the signer through a certificate stored in the application server with a certificate of a Certification Authority that issued it, a certificate stored in the application server and the certificate of the Certification Authority being associated with the signer.

2. The system according to claim 1, wherein the operation request is any of: a payment request, advertising integrated with payment request or a document subscription request, an access request to log-in, access to physical areas, withdraw cash, perform actions controlling machines and/or engines or orders on network services.

3. The system according to claim 1, wherein the front-end server is configured to add, during validation, a variable part comprising at least one unique identifier and a timestamp of the operation request or to validate the variable part and the timestamp if received in the operation request.

4. The system according to claim 1, wherein the front-end server comprises a registered user database of the dedicated server network and is configured to verify, in the registered user database, the presence of the signer mobile device and information associated with the signer mobile device to route the operation request to the respective application server of the signer mobile device.

5. The system according to claim 4, wherein the one or more application servers are configured to update a corresponding status of the operation on the front-end server on the basis of a unique identifier of the operation request, and in that requester device is automatically updated through a status message sent by the one or more application servers, wherein, in case of positive status message, protected information is automatically displayed on a user interface of the requester device when related operation request is of access type.

6. The system according to claim 1, wherein the signer mobile device and the requester device are included within a common mobile device.

7. The system according to claim 6, wherein the request message sent by the requester device is used instead of the request message sent by the one or more application servers, and is exchanged internally within the common mobile device, and wherein the confirmation message sent by the requester device is used instead of the confirmation message sent by the one or more application servers, and is exchanged internally within the common mobile device.

8. The system according to claim 1, wherein the signer mobile device includes an accelerometer and is configured to:
   acquire movement data, of the signer mobile device from the accelerometer;
   register acceleration curves depending on time variable on a basis of the movement data;
   compare registered acceleration curves with predefined acceleration curves;
   in response to a match of registered acceleration curves with the predefined acceleration curves within a predefined tolerance, place the signer mobile device into a listening mode for a predetermined time to receive request messages or read request messages by calling an additional intermediate server that temporary stores the request messages.

9. The system, according to claim 1, wherein the security memory is not certified for a qualified electronic signature.

\* \* \* \* \*